(12) United States Patent
Tanishima et al.

(10) Patent No.: US 8,983,694 B2
(45) Date of Patent: *Mar. 17, 2015

(54) CONTROL APPARATUS AND METHOD FOR HYBRID VEHICLE

(75) Inventors: Kaori Tanishima, Isehara (JP); Hiroaki Kawamura, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 120 days.

This patent is subject to a terminal disclaimer.

(21) Appl. No.: 13/810,733

(22) PCT Filed: Jul. 19, 2011

(86) PCT No.: PCT/IB2011/001677
§ 371 (c)(1),
(2), (4) Date: Jan. 17, 2013

(87) PCT Pub. No.: WO2012/010951
PCT Pub. Date: Jan. 26, 2012

(65) Prior Publication Data
US 2013/0124027 A1    May 16, 2013

(30) Foreign Application Priority Data
Jul. 21, 2010    (JP) .................................. 2010-164194

(51) Int. Cl.
*B60W 20/00*    (2006.01)
*B60W 10/06*    (2006.01)
(Continued)

(52) U.S. Cl.
CPC .................. *B60W 20/20* (2013.01); *B60K 6/48* (2013.01); *B60W 10/02* (2013.01); *B60W 10/06* (2013.01);
(Continued)

(58) Field of Classification Search
CPC ...... B60K 6/445; B60K 6/48; B60K 23/0808; B60L 7/26; B60T 8/175; B60T 8/17636; B60T 8/1769; B60W 10/02; B60W 10/06; B60W 10/08; B60W 10/10; B60W 10/11; B60W 20/00; B60W 20/20; B60W 30/19; B60W 30/192; B60W 2600/00; F16H 61/16; F16H 2061/163; Y02T 10/6221; Y02T 10/6286; Y10S 903/93

USPC ......... 701/22, 81; 180/65, 265; 903/902–903, 903/909, 915, 930
See application file for complete search history.

(56) References Cited

U.S. PATENT DOCUMENTS

| | | | |
|---|---|---|---|
| 5,405,303 A | 4/1995 | Takada et al. | |
| 2002/0173391 A1 * | 11/2002 | Endo et al. | 474/18 |

(Continued)

FOREIGN PATENT DOCUMENTS

| | | |
|---|---|---|
| EP | 1 859 982 A2 | 11/2007 |
| JP | 2007-297014 A | 11/2007 |

(Continued)

OTHER PUBLICATIONS

Decision on Grant from the Russian Patent Office, dated Apr. 7, 2014, for the corresponding Russian Patent Application No. 2013107554/11(011221) filed Jul. 19, 2011, with English translation.

*Primary Examiner* — Mary Cheung
*Assistant Examiner* — Atul Trivedi
(74) *Attorney, Agent, or Firm* — Young Basile

(57) ABSTRACT

A control apparatus and method for controlling a hybrid vehicle is arranged to prevent shock and to minimize adverse influence on lag and fuel consumption when one of a start/stop control of an engine and a shift control of an automatic transmission is requested while the other control is occurring. The control apparatus includes an engine, a motor/generator, a first clutch, an automatic transmission, an integrated controller, an AT controller and an engine/transmission coordinate controlling section. When a second control request is generated during the first control, the engine/transmission coordinate controlling section starts the second control at a request timing when a condition does not exist such that a shock does not exceed an acceptable level and starts the second control at a later timing when the condition exists such that the shock would exceed the acceptable level if the second control is started at the request timing.

11 Claims, 13 Drawing Sheets

(51) Int. Cl.
*B60W 10/08* (2006.01)
*B60W 10/11* (2012.01)
*B60K 6/48* (2007.10)
*B60W 10/02* (2006.01)
*B60W 10/10* (2012.01)
*B60W 30/19* (2012.01)
*B60W 30/192* (2012.01)
*F16H 61/16* (2006.01)

(52) U.S. Cl.
CPC ............... *B60W 10/08* (2013.01); *B60W 10/10* (2013.01); *B60W 20/00* (2013.01); *B60W 30/19* (2013.01); *B60W 30/192* (2013.01); *F16H 61/16* (2013.01); *F16H 2061/163* (2013.01); *Y02T 10/6221* (2013.01); *Y02T 10/6286* (2013.01); *B60W 10/11* (2013.01); *B60W 2600/00* (2013.01); *Y10S 903/93* (2013.01)
USPC .......................... 701/22; 180/65.265; 903/930

(56) References Cited

U.S. PATENT DOCUMENTS

| | | | |
|---|---|---|---|
| 2004/0259680 A1 | 12/2004 | Ozeki et al. | |
| 2008/0051254 A1* | 2/2008 | Satou et al. | 477/109 |
| 2008/0154455 A1* | 6/2008 | Hidaka et al. | 701/22 |
| 2008/0176708 A1 | 7/2008 | Tamai et al. | |
| 2009/0055073 A1* | 2/2009 | Matsubara et al. | 701/102 |
| 2009/0143189 A1* | 6/2009 | Hasegawa et al. | 477/5 |
| 2010/0227735 A1* | 9/2010 | Sah et al. | 477/5 |
| 2010/0228412 A1* | 9/2010 | Sah | 701/22 |

FOREIGN PATENT DOCUMENTS

| | | |
|---|---|---|
| JP | 2008-179242 A | 8/2008 |
| JP | 2009-047107 A | 3/2009 |
| JP | 2009-143501 A | 7/2009 |
| JP | 2010-006152 A | 1/2010 |

* cited by examiner

AT

|  | B1 Fr/B | C1 I/C | C2 D/C | C3 H&LR/C | B2 LOW/B | B3 2346/B | B4 R/B | F1 1st OWC | F2 1&2 OWC |
|---|---|---|---|---|---|---|---|---|---|
| 1st | (○) |  |  | (○) | ○ |  |  | ○ | ○ |
| 2nd |  |  |  | (○) | ○ | ○ |  |  | ○ |
| 3rd |  |  | ○ |  | ○ | ○ |  |  |  |
| 4th |  |  | ○ | ○ |  | ○ |  |  |  |
| 5th |  | ○ | ○ | ○ |  |  |  |  |  |
| 6th |  | ○ |  | ○ |  | ○ |  |  |  |
| 7th | ○ | ○ |  | ○ |  |  | ○ |  |  |
| Rev. | ○ |  |  | ○ |  |  | ○ |  |  |

| CurGp \ NextGp | 1 | 2 | 3 | 4 | 5 | 6 | 7 |
|---|---|---|---|---|---|---|---|
| 1 | Low/B | Low/B | Low/B | Low/B | Low/B | Low/B | Low/B |
| 2 | Low/B | Low/B | D/C | Low/B | Low/B | Low/B | Low/B |
| 3 | D/C | Low/B | D/C | H/C | D/C | D/C | D/C |
| 4 | H/C | H/C | H/C | H/C | H/C | H/C | H/C |
| 5 | H/C | H/C | H/C | H/C | H/C | H/C | H/C |
| 6 | I/C | I/C | I/C | I/C | I/C | I/C | I/C |
| 7 | I/C | I/C | I/C | I/C | I/C | I/C | I/C |

CONTROL APPARATUS AND METHOD FOR HYBRID VEHICLE

CROSS-REFERENCE TO RELATED APPLICATIONS

This application claims priority from Japanese Patent Application No. 2010-164194, filed Jul. 21, 2010, which is incorporated herein in its entirety by reference.

TECHNICAL FIELD

The present invention relates to control apparatus for a hybrid vehicle having an engine, a motor and an automatic transmission in a drive system and to a method of controlling such a vehicle.

BACKGROUND

A control system for a hybrid vehicle of an earlier technology is arranged to perform an engine start control and a shift control separately to prevent shock due to simultaneous performance of the engine start control and the shift control. Accordingly, if the engine start control is started first, the shift control is started after the engine start control is finished. If the shift control is started first, the engine start control is started after the shift control is finished. Such a control system is described in Japanese Unexamined Patent Application No. H10-2241, for example.

BRIEF SUMMARY

In such a control system, the engine start control and the shift control are generally performed exclusively even in the situation in which the simultaneous performance of the engine start control and shift control is not problematical. Therefore, when the engine start is deferred and the shift control is started first, the control apparatus provides the driver a feeling of lag of a rise of the driving force. Moreover, the driver tends to depress the accelerator pedal deeper since the driving force is not increased. Therefore, the further depression of the accelerator pedal causes an abrupt increase of the driving force, and a feeling of dash-out at the time of a start of the engine start control. Accordingly, exclusive performance of the engine start control and the shift control exerts adverse influence on lag and fuel consumption, and moreover the driver becomes unable to control the driving force properly.

In contrast, embodiments of the present invention provide control apparatus and/or control method for a hybrid vehicle that can prevent a shock and minimize influence on lag and fuel consumption when a control request for one control is generated during a control of the other with respect to the engine start/stop control of the engine and the shift control of the automatic transmission.

To achieve this object, a control apparatus for controlling a hybrid vehicle comprises an engine, a motor, a mode selecting device, an automatic transmission, an integrated controller and an automatic transmission controller. The motor is provided in a drive system extending from the engine to a driving wheel and is arranged to start the engine and drive the driving wheel. The mode selecting device is provided between the engine and the motor and is arranged to change over a vehicle drive mode between a hybrid drive mode using the engine and the motor as a drive source and an electric drive mode using the motor as the drive source. The automatic transmission is disposed between the motor and the driving wheel and is arranged to have a plurality of gear positions of different speed ratios. The integrated controller performs an engine start/stop control, the engine start/stop control being a start control of the engine in response to a start request at the time of mode changeover to the hybrid drive mode or a stop control of the engine in response to a stop request at the time of the mode changeover to the electric drive mode. The automatic transmission controller performs a shift control of changing the gear position of the automatic transmission from a current position to a request position in response to a shift request during travel of the vehicle. The integrated controller receives during a first control, which is one of the engine start/stop control of the engine and the shift control of the automatic transmission, a control request for a second control, which is the other of the engine start/stop control and the shift control. When a shock will not exceed an acceptable level if the second control is started at a request timing of the control request of the second control during the first control, the integrated controller starts the second control at the request timing. When the shock will exceed the acceptable level if the second control is started at the request timing, the integrated controller waits and starts the second control at the permitting timing.

Therefore, in the situation in which the shock is not problematical even if the engine start control and shift control are performed simultaneously, the control system starts the second control responsively at the timing of the control request for the second control if the second control request is generated during the first control. Moreover, in the situation in which the shock is problematical if the engine start control and shift control are performed simultaneously, the control apparatus waits until the timing permitting the second control when the second control request is generated during the first control and then starts the shift control.

Thus, in the situation where the shock is not problematical, the control system processes the engine start control and shift control simultaneously with a high responsiveness without a delay. In the situation where the shock is problematical, the control apparatus processes the engine start control and shift control simultaneously after a minimum period for deferring a start of the control until the timing of transition to the situation where the shock is not problematical. Therefore, when one control is requested during the other, the control apparatus can prevent a shock and moreover restrain adverse influence to the lag and fuel consumption to a minimum level.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
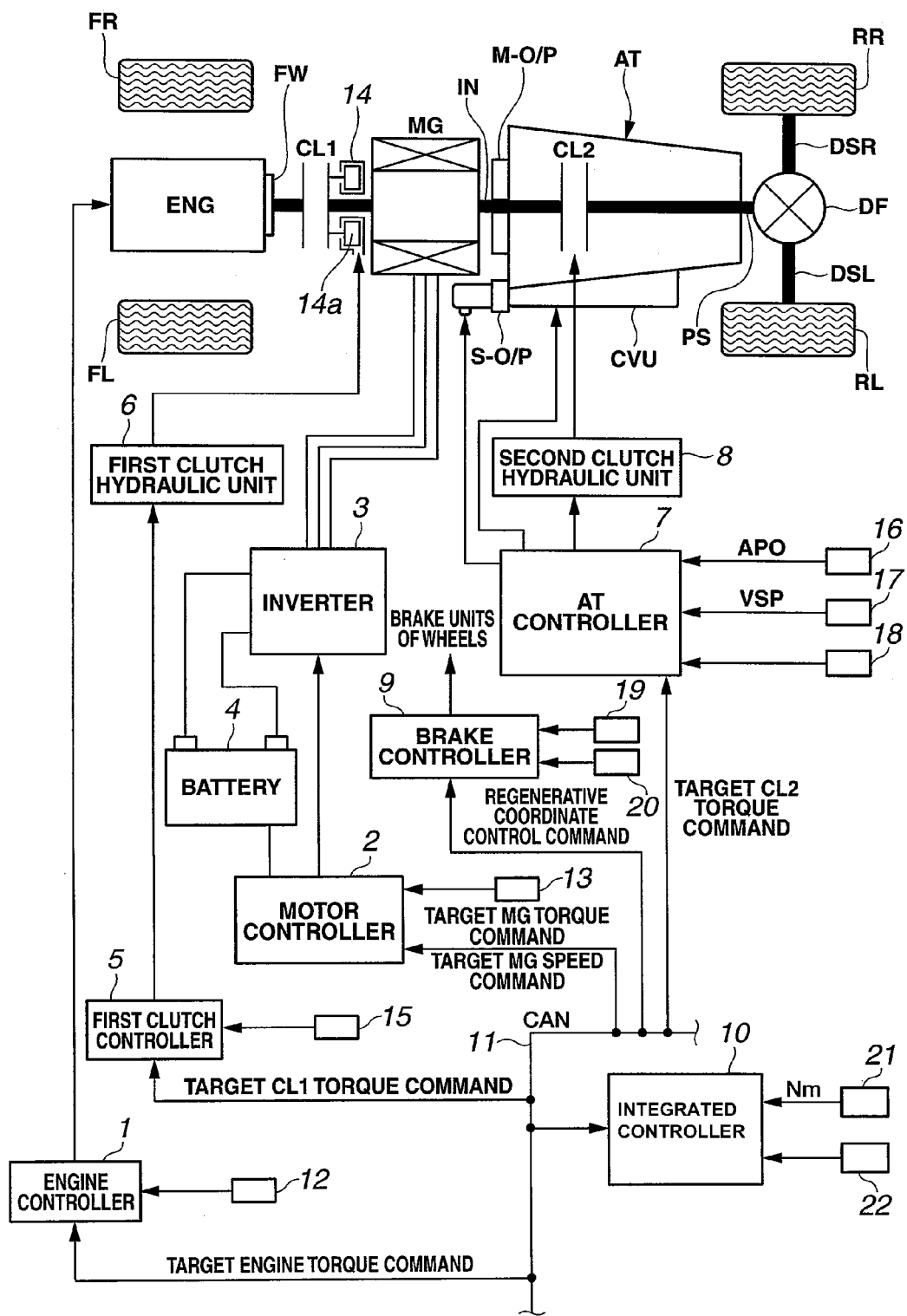
FIG. 1 is a view showing an example of a hybrid vehicle in which a control apparatus according to embodiments of the invention can be applied.

FIG. 1 shows a hybrid vehicle of a rear wheel drive type to which a control apparatus according embodiments of the present invention can be applied. As shown in FIG. 1, the drive system of an FR hybrid vehicle includes an engine ENG, a flywheel FW, a first clutch CL1 (mode selecting means or mode changeover means), a motor/generator MG (motor), a second clutch CL2, an automatic transmission AT, a transmission input shaft IN, a mechanical oil pump M-O/P, a sub oil pump S-O/P, a propeller shaft PS, a differential DF, a left drive shaft DSL, a right drive shaft DSR, a left rear wheel RL (driving wheel) and a right rear wheel RR (driving wheel). The vehicle further includes a left front wheel FL and a right front wheel FR.

Engine ENG may be a gasoline engine or a diesel engine and is controlled under engine control commands from an engine controller 1. With the engine control commands, the engine controller 1 performs an engine start control, an engine stop control, a throttle valve opening control, a fuel cut control, etc. The engine output shaft is provided with flywheel FW.

First clutch CL1 is a clutch provided between engine ENG and motor/generator MG. First clutch CL1 is controlled among the states of engagement, half-engagement (or slipping engagement) and disengagement (or release), with a first clutch control fluid pressure produced by a first clutch hydraulic unit 6 under a first clutch control command from a first clutch controller 5. For example, first clutch CL1 is a normally-closed dry single-plate clutch including a diaphragm spring for holding the full engagement with its resilient force. First clutch CL1 uses a hydraulic actuator 14 that includes a piston 14a arranged to perform stroke control among full engagement, slipping engagement and full disengagement. First clutch CL1 is engaged when oil pressure is not supplied.

Motor/generator MG is a synchronous type motor/generator including a rotor provided with embedded permanent magnet(s) and a stator provided with a stator coil winding thereabout. Under control command from a motor controller 2, motor/generator MG is controlled by the application of three-phase AC current produced by an inverter 3. Motor/generator MG can function as a motor driven by receiving the supply of power from a battery 4 (called power running) and function as a generator for generating an electromotive force across the stator coil and charging battery 4 where the rotor receives rotation energy from engine ENG or the driving wheels (regeneration). The rotor of motor/generator MG is connected with transmission input shaft IN of automatic transmission AT.

Second clutch CL2 is a clutch provided between motor/generator MG and left and right rear wheels RL, RR. Second clutch CL2 is controlled among the states of engagement, slipping engagement and disengagement (or release), with a control fluid pressure produced by a second clutch hydraulic unit 8 under a second clutch control command from an AT controller 7. For example, second clutch CL2 is a normally-open multiple-plate wet clutch or multiple-plate wet brake that is disengaged when the oil pressure is not supplied and is provided with a proportional solenoid capable of controlling the oil flow rate and fluid pressure continuously. In this example, first clutch hydraulic unit 6 and second clutch hydraulic unit 8 are disposed in a fluid pressure control valve unit CVU attached to automatic transmission AT.

Automatic transmission AT is a multiple speed transmission (or step AT) capable of changing the gear ratio automatically among a plurality of speeds in accordance with the vehicle speed and accelerator opening degree. In the illustrated example of the first embodiment, automatic transmission AT is a step transmission having 7 forward speeds and 1 reverse speed. In this example, second clutch CL2 is not a special independent clutch specifically added to automatic transmission AT. Instead, second clutch CL2 is a selected one of the friction engagement elements (clutch(es) and/or brake(s)) that are selectively engaged to achieve one of the speeds. Among the friction engagement elements, one meeting a predetermined condition is selected and used as second clutch CL2.

Mechanical oil pump M-O/P is provided on transmission input shaft IN (also called a motor shaft) of automatic transmission AT and is arranged to be driven by transmission input shaft IN. Sub oil pump A-O/P is a pump driven by an electric motor to prevent a fluid pressure decrease when the discharge pressure of mechanical pump M-O/P becomes insufficient because of stoppage of the vehicle or for some other reason. Sub oil pump S-O/P is provided in a motor housing or the like in this example. The drive of sub oil pump S-O/P is controlled by AT controller 7 as mentioned later.

Propeller shaft PS is connected with the transmission output shaft of automatic transmission AT. Propeller shaft PS is also connected to left and right rear wheels RL and RR through differential DF and left and right drive shafts DSL and DSR.

This FR hybrid vehicle has, as drive modes, an electric vehicle mode (hereinafter referred to as EV mode), a hybrid vehicle mode (hereinafter referred to as HEV mode) and a drive torque control mode (hereinafter referred to as WSC mode).

The EV mode is a mode in which first clutch CL1 is disengaged, and the vehicle is driven only by the driving force of motor/generator MG. The EV mode includes a motor drive mode and a regenerative drive mode. The EV mode is selected when the request driving force (that is, the request driving torque) is low and the battery SOC is ensured.

The HEV mode is a mode in which first clutch CL1 is engaged, and the vehicle is driven in the engaged state of first clutch CL1. The HEV mode includes a motor assist drive mode, a power generating drive mode and an engine drive mode. The vehicle is driven in one of these modes. The HEV mode is selected when the request driving force is high or when the battery SOC is insufficient.

The WSC mode (drive torque control mode) is a mode for driving the vehicle by holding second clutch CL2 in the slipping engagement state by controlling the rotational speed of motor/generator MG and thereby controlling the clutch torque capacity so as to match the clutch transmission torque through second clutch CL2 to the request driving torque determined by the vehicle operating condition and the driver's operation. The WSC mode is selected in a driving region in which the engine rotation speed becomes lower than an idle rotation speed as in situation in which the vehicle is stopped, started or decelerated when in the HEV mode.

A control system of the FR hybrid vehicle is configured as explained below. As shown in FIG. 1, the control system of the FR hybrid vehicle according to the first embodiment includes engine controller 1, motor controller 2, inverter 3, battery 4, first clutch controller 5, first clutch hydraulic unit 6, AT controller 7, second clutch hydraulic unit 8, brake controller 9 and integrated controller 10. Integrated controller 10 is connected with the controllers 1, 2, 5, 7 and 9 through a CAN communication line 11 enabling information exchange.

Integrated controller 10 and the other controllers described herein generally consist of a respective microcomputer including central processing unit (CPU), input and output ports (I/O) receiving certain data described herein, random access memory (RAM), keep alive memory (KAM), a common data bus and read only memory (ROM) as an electronic storage medium for executable programs and certain stored values as discussed herein. The functional (or processing) units of the integrated controller 10 described herein (and the other controllers where appropriate) could be, for example, implemented in software as the executable programs, or could be implemented in whole or in part by separate hardware in the form of one or more integrated circuits (IC). Integrated controller 10 can be an engine control unit (ECU) as known in the art programmed as described herein. Other controllers described herein can be similarly structured. Also, although multiple controllers are shown, fewer or more are possible.

Engine controller 1 receives the engine rotational speed from an engine rotational speed sensor 12, a target engine torque command from integrated controller 10 and other required information. Then, engine controller 1 delivers a command for controlling an engine operating point (Ne, Te) to a throttle valve actuator of engine ENG, etc.

Motor controller 2 receives a rotor rotational position of motor/generator MG sensed by a resolver 13, target MG torque command and target MG rotational speed command from integrated controller 10 and other required information. Then, motor controller 2 delivers a command to inverter 3 for controlling a motor operating point (Nm, Tm) of motor/generator MG. Moreover, motor controller 2 monitors the battery state of charge (SOC) representing a charging capacity of battery 4 and supplies information on the battery SOC to integrated controller 10 through CAN communication line 11.

First clutch controller 5 receives a stroke position of piston 14a of hydraulic actuator 14 sensed by a first clutch stroke sensor 15, target CL1 torque command from integrated controller 10 and other required information. Then, first clutch controller 5 delivers a command to first clutch hydraulic unit 6 in hydraulic control valve unit CVU to control the engagement, half-engagement or disengagement state of first clutch CL1.

Figure 2:
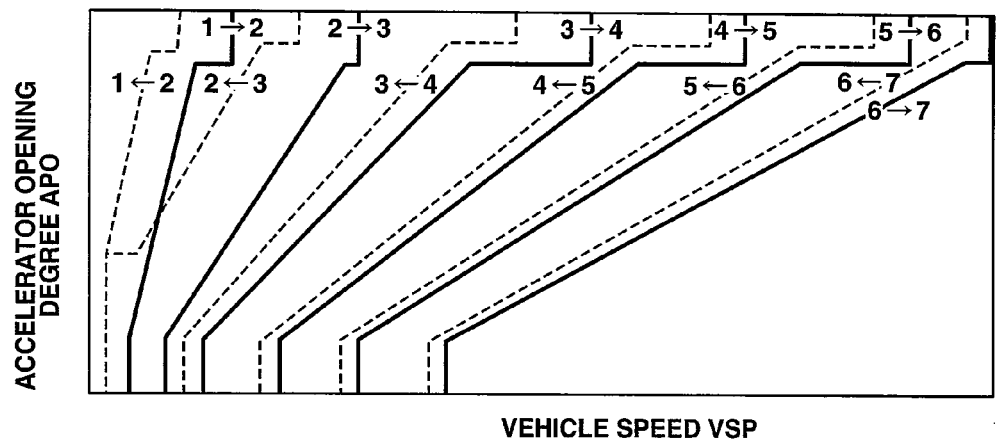
FIG. 2 is a view showing an example of a shift map of an automatic transmission of FIG. 1.

AT controller 7 receives information from accelerator opening sensor 16, vehicle speed sensor 17 and other sensors 18. During a vehicle traveling operation with the D (drive) range being selected, AT controller 7 determines an optimum speed ratio by checking a position of the operating point determined by the accelerator opening degree APO and vehicle speed VSP in a shift map shown by example in FIG. 2. Then, AT controller 7 delivers a control command to hydraulic control valve unit CVU to achieve the selected speed ratio. As shown in FIG. 2, the shift map includes upshift lines and downshift lines depending on the accelerator opening APO and vehicle speed VSP. In addition to this shift control, AT controller 7 receives a target CL2 torque command from integrated controller 10 and, in response, performs a second clutch control by outputting a command to second clutch hydraulic unit 8 in the hydraulic control valve unit CVU to control the slipping engagement of second clutch CL2.

Brake controller 9 receives the wheel speeds of the four wheels sensed by wheel speed sensors 19, the brake stroke BS sensed by a brake stroke sensor 20, a regeneration coordinate control command from integrated controller 10 and other required information. Then, brake controller 9 performs a regeneration coordinate control to compensate for a deficit with a mechanical braking force (hydraulic braking force and/or motor braking force) when a regenerative braking force alone is insufficient to achieve a request braking force determined from brake stroke BS at the time of brake depression, for example.

Integrated controller 10 performs functions to manage the consumed energy of the vehicle as a whole and to drive the vehicle with a highest efficiency. Integrated controller 10 receives required information from a motor rotational speed sensor 21 for sensing a motor rotational speed Nm and other sensors/switches 22, and information through the CAN communication line 11. Then, integrated controller 10 delivers a target engine torque command to engine controller 1, a target MG torque command and target MG speed command to motor controller 2, a target CL1 torque command to first clutch controller 5, a target CL2 torque command to AT controller 7 and a regeneration coordinate control command to brake controller 9.

Figure 3:
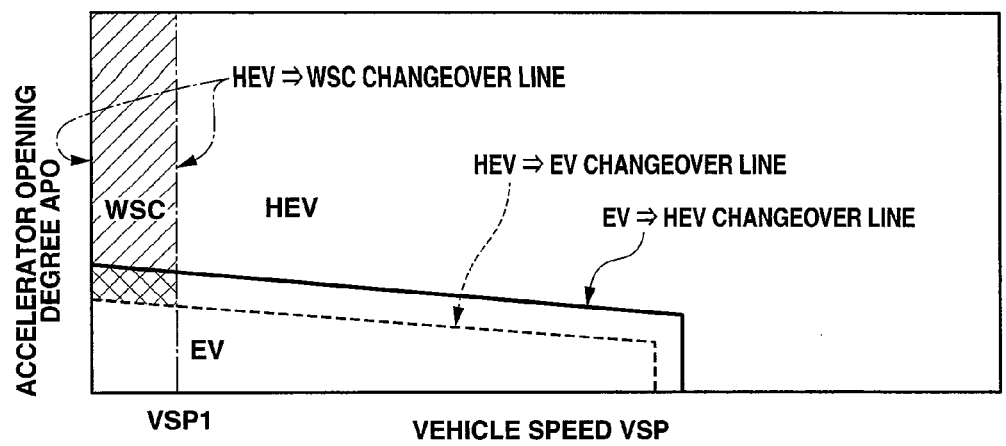
FIG. 3 is a view showing an example of a EV-HEV selection map according to a first embodiment.

Integrated controller 10 includes a mode selecting section for searching an optimum drive mode in accordance with the position of the operating point determined by accelerator opening degree APO and vehicle speed VSP in an EV-HEV selection map shown by example in FIG. 3. Integrated controller 10 then selects the thus-determined drive mode as a desired target drive mode. The EV-HEV selection map includes an EV→HEV changeover line for change over of the drive mode from "EV mode" to "HEV mode" in the case of traverse of the operating point (APO, VSP) across that line from the EV region, a HEV→EV changeover line for change over of the drive mode from "HEV mode" to "EV mode" in the case of traverse of the operating point (APO, VSP) across that line from the HEV region, and a HEV→WSC changeover line for change over of the drive mode to "WSC mode" in the case of ingress of the operating point (APO, VSP) into WSC region during operation in the HEV mode. The HEV→EV changeover line and EV→HEV changeover line are arranged to provide a hysteresis as a boundary separating the EV region and the HEV region. The HEV→WSC changeover line extends along a line of a first set vehicle speed VSP1 at which engine ENG is held at an idle rotational speed when automatic transmission AT is at the first speed. When the battery SOC becomes lower than or equal to a predetermined value during the selection of "EV mode", the target drive mode is forcibly changed to "HEV mode".

Figures 4, 5:
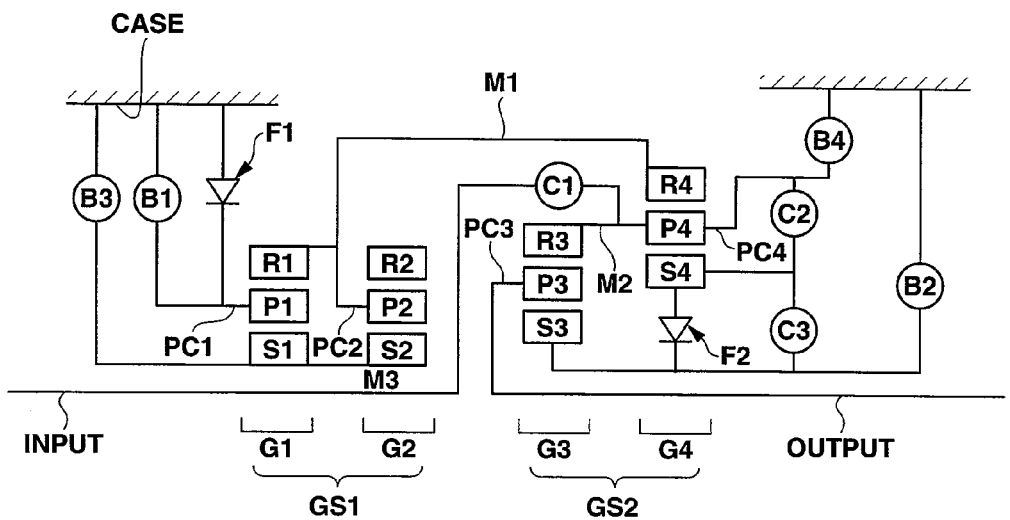
FIG. 4 is a skeleton view showing one example of the automatic transmission of FIG. 1.
FIG. 5 is a view showing an engagement table representing the engagement state of each friction element of the gear positions in the automatic transmission of FIG. 1.

FIG. 4 is a skeleton view showing one example of automatic transmission AT installed in the FR hybrid vehicle provided with the control system according to the first embodiment. Automatic transmission AT of this example is a step automatic transmission having seven forward speeds and one reverse speed. A driving force obtained from a driving source including only the motor/generator MG or both of motor/generator MG and engine ENG is inputted to transmission input shaft IN (INPUT), the rotational speed is changed by four planetary gears and seven friction engagement elements, and output rotation is outputted from the transmission output shaft OUTPUT.

The transmission gear mechanism includes a first gear set GS1 including a first planetary gear G1 and a second planetary gear G2, and a second gear set GS2 including a third planetary gear G3 and a fourth planetary gear G4 arranged in order on the axis from transmission input shaft INPUT to transmission output shaft OUTPUT. The friction engagement element group includes first clutch C1 (or input clutch I/C), second clutch C2 (or direct clutch D/C), third clutch C3, first brake B1, second brake B2, third brake B3 and fourth brake B4. There are further provided first one-way clutch F1 and second one-way clutch F2.

First planetary gear G1 is a single pinion type planetary gear including first sun gear S1, first ring gear R1, first pinions P1 and first carrier PC1. Second planetary gear G2 is a single pinion type planetary gear including second sun gear S2, second ring gear R2, second pinions P2 and second carrier PC2. Third planetary gear G3 is a single pinion type planetary gear including third sun gear S3, third ring gear R3, third pinions P3 and third carrier PC3. Fourth planetary gear G4 is a single pinion type planetary gear including fourth sun gear S4, fourth ring gear R4, fourth pinions P4 and fourth carrier PC4.

Transmission input shaft INPUT is connected with second ring gear R2 (solid connecting line is omitted from FIG. 4) and is adapted to receive the rotational driving force from at least one of engine ENG and motor/generator MG. Transmission output shaft OUTPUT is connected with third carrier PC3 and is arranged to deliver an output rotational driving force through the final gear to the driving wheel (left and right rear wheels RL, RR).

A first connecting member M1 connects the first ring gear R1, second carrier PC2 and fourth ring gear R4 together so that they rotate as a unit. A second connecting member M2 connects the third ring gear R3 and fourth carrier PC4 together so that they rotate as a unit. A third rotating member M3 connects the first sun gear S1 and second sun gear S2 together so that they rotate as a unit.

First clutch C1 is a clutch for selectively making and breaking a connection between transmission input shaft INPUT and second connecting member M2. Second clutch C2 is a clutch for selectively making and breaking a connection between fourth sun gear S4 and fourth carrier PC4. Third clutch C3 (or H&LR clutch H&LR/C) is a clutch for selectively making and breaking a connection between third sun gear S3 and fourth sun gear S4. Second one-way clutch F2 (or 1&2 speed one-way clutch 1&2OWC) is disposed between third sun gear S3 and fourth sun gear S4. First brake B1 (or front brake Fr/B) is a brake for selectively holding the first carrier PC1 nonrotating to a transmission case CASE. First one-way clutch F1 (or first speed one-way clutch 1stOWC) is disposed in parallel with first brake B1. Second brake B2 (or low brake LOW/B) is a brake for selectively holding third sun gear S3 non-rotating to transmission case CASE. Third brake B3 (or 2346 brake 2346/B) is a brake for selectively holding the third rotating member M3, connecting first and second sun gears S1 and S2, non-rotating to transmission case CASE. Fourth brake B4 (or reverse brake R/B) is a brake for selectively holding the fourth carrier PC4 non-rotating to transmission case CASE.

FIG. 5 shows an engagement table showing the engagement states of the friction engagement elements in each speed in the automatic transmission AT of FIG. 4 installed in the FR hybrid vehicle according to FIG. 1. In FIG. 5, a white circle indicates hydraulic engagement in the drive state, a white circle in parentheses indicates hydraulic engagement in the coast state (one-way clutch operation in the drive state), and no mark indicates disengagement.

The thus-constructed shift gear mechanism can achieve seven forward speeds and one reverse speed as mentioned below by a replacing shift operation of disengaging one element and engaging another element.

In "first speed", only second brake B2 is engaged and accordingly first and second one-way clutches F1 and F2 engage. In "second speed", second brake B2 and third brake B3 are engaged, and second one-way clutch F2 engages. In "third speed", second brake B2, third brake B3 and second clutch C2 are engaged, and first and second one-way clutches F1 and F2 do not engage. In "fourth speed", third brake B3, second clutch C2 and third clutch C3 are engaged. In "fifth speed", first clutch C1, second clutch C2 and third clutch C3 are engaged. In "sixth speed", third brake B3, first clutch C1 and third clutch C3 are engaged. In "seventh speed", first brake B1, first clutch C1 and third clutch C3 are engaged, and first one-way clutch F1 engages. In "reverse speed", fourth brake B4, first brake B1 and third clutch C3 are engaged.

Figure 6:
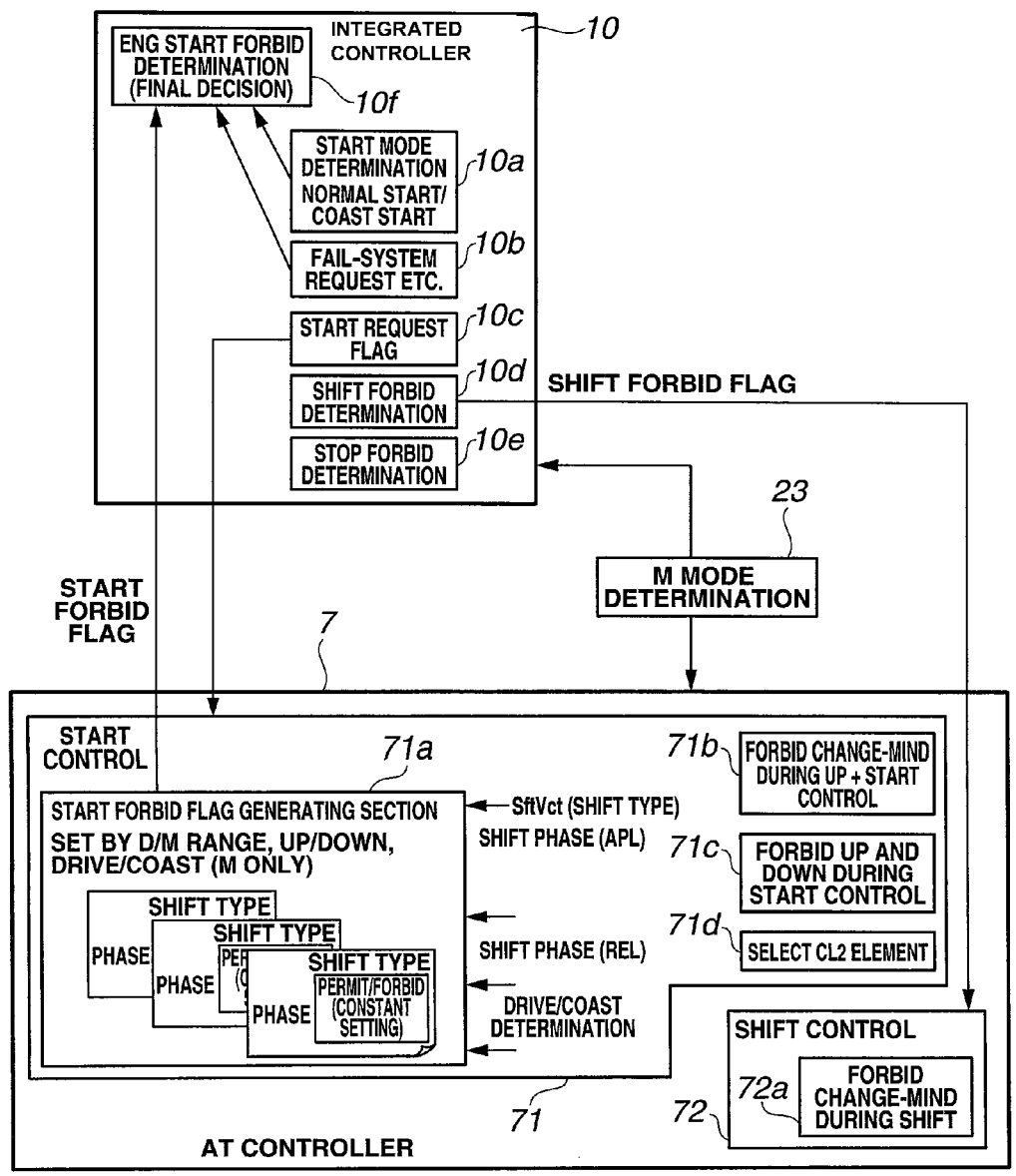
FIG. 6 is a control block diagram showing an engine/transmission coordinate control system according to the first embodiment.

FIG. 6 is a control block diagram showing integrated controller 10 and AT controller 7 according to the first embodiment configured to form an engine/transmission coordinate control system (or engine/shift cooperation control system) coordinating the engine start control and shift control.

The engine/transmission coordinate system shown in FIG. 6 is characterized by a shift forbid flag set by integrated controller 10 having information on the engine control and delivered to AT controller 7, and a start forbid flag set by AT controller 7 having information on the shift control and delivered to integrated controller 10. If, for example, integrated controller 10 is arranged to set both of the shift forbid flag and start forbid flag, the integrated controller 10 must receive detailed information on the shift control from AT controller 7. By contrast to this arrangement, the arrangement of FIG. 6 makes it possible to set the start forbid flag accurately without receiving detailed information on the shift control from AT controller 7. Accordingly, this configuration is preferred but not required.

As shown in FIG. 6, integrated controller 10 includes a start mode determining section 10a, a fail-system request determining section 10b, a start request flag generating section 10c, a shift forbiddance determining section 10d (shift forbid flag setting means), an engine stop forbiddance determining section 10e and an engine start forbiddance determining section 10f.

Start mode selecting section 10a selects one of a normal start and a coast start and delivers the result of the selection to the engine start forbiddance determining section 10f. Fail-system request determining section 10b determines a failsafe request and a component protect request and delivers the results of the determination to engine start forbiddance determining section 10f. Start request flag generating section 10c generates an engine start request flag and delivers it to a start control section 71 of AT controller 7 discussed hereinafter. Shift forbiddance determining section 10d (shift forbid flag setting means) sets the shift forbid flag and delivers it to a shift control section 72 of AT controller 7 discussed hereinafter. Stop forbiddance determining section 10e determines engine stop forbiddance. Engine start forbiddance determining section 10f receives the start forbid flag from a start forbid flag generating section 71a (also called a start forbid flag setting section) of start control section 71, the result of the selection from start mode determining section 10a, and the results of the determination from fail-system request determining section 10b. In response, engine start forbiddance determining section 10e determines the engine start forbiddance including priorities of engine start forbidding conditions. The priorities (or degrees of priority) are: 1 failsafe, 2 component protection, 3 performance request and 4 fuel consumption—exhaust emission request. Information on priorities 1 and 2 is obtained from fail-system request determining section 10b, and information on priorities 3 and 4 is obtained by the start forbid flag from start forbid flag generating section 71a.

As shown in FIG. 6, AT controller 7 includes start control section 71 and shift control section 72. Start control section 71 includes start forbid flag generating section 71a, an UP+start control change-mind forbidding section 71b, a start control up forbidding down permitting section 71c and a CL2 element selecting section 71d. Shift control section 72 includes a shift change mind forbidding section 72a.

Start forbid flag generating section 71a receives a shift type, an existence or nonexistence of manual mode (M mode), shift phase (engagement side), shift phase (disengagement side) and drive/coast determining information. Then, start forbid flag generating section 71a generates the start forbid flag (zero: permit, 1: forbid) and sends the start forbid flag to engine start forbiddance determining section 10f of integrated controller 10. The shift phases are: (a) pretreatment, (b) torque phase, (c) inertia phase, (d) CL synchronizing phase and (e) after-treatment, and the start forbid flag is set and cleared individually. The existence or nonexistence of the manual mode for performing up/down shifts in automatic transmission AT by a manual lever operation is obtained from an M mode determining section 23, which can be part of either integrated controller 10 or AT controller 7.

CL2 element selecting section 71d selects the CL2 element from the friction engagement elements of automatic transmission AT based on a current gear position (CurGp) and a next gear position (NextGp). As shown by example in FIG. 9, CL2 element selecting section 71d selects Low/B in first speed, Low/B in second speed, D/C in third speed, H/C in fourth speed, H/C in fifth speed, I/C in sixth speed and I/C in seventh speed. In the case of an upshift (N→+1), the CL2 element is determined by N+1 after the upshift (NextGp), in order to treat as the N+1 speed start and perform an up rotation speed change simultaneously during the start control. In the case of downshift (N→N−1), the CL2 element is determined by N (CurGp) before the downshift, in order to treat as the N speed start and perform a start operation at lower rotational speed. There is an exception in the case of a 3→2 downshift where the CL2 element is Low/B after the downshift. This is because the torque share ratio is varied largely between second speed and third speed, and shock sensitivity is better when setting in second speed.

Figure 7:
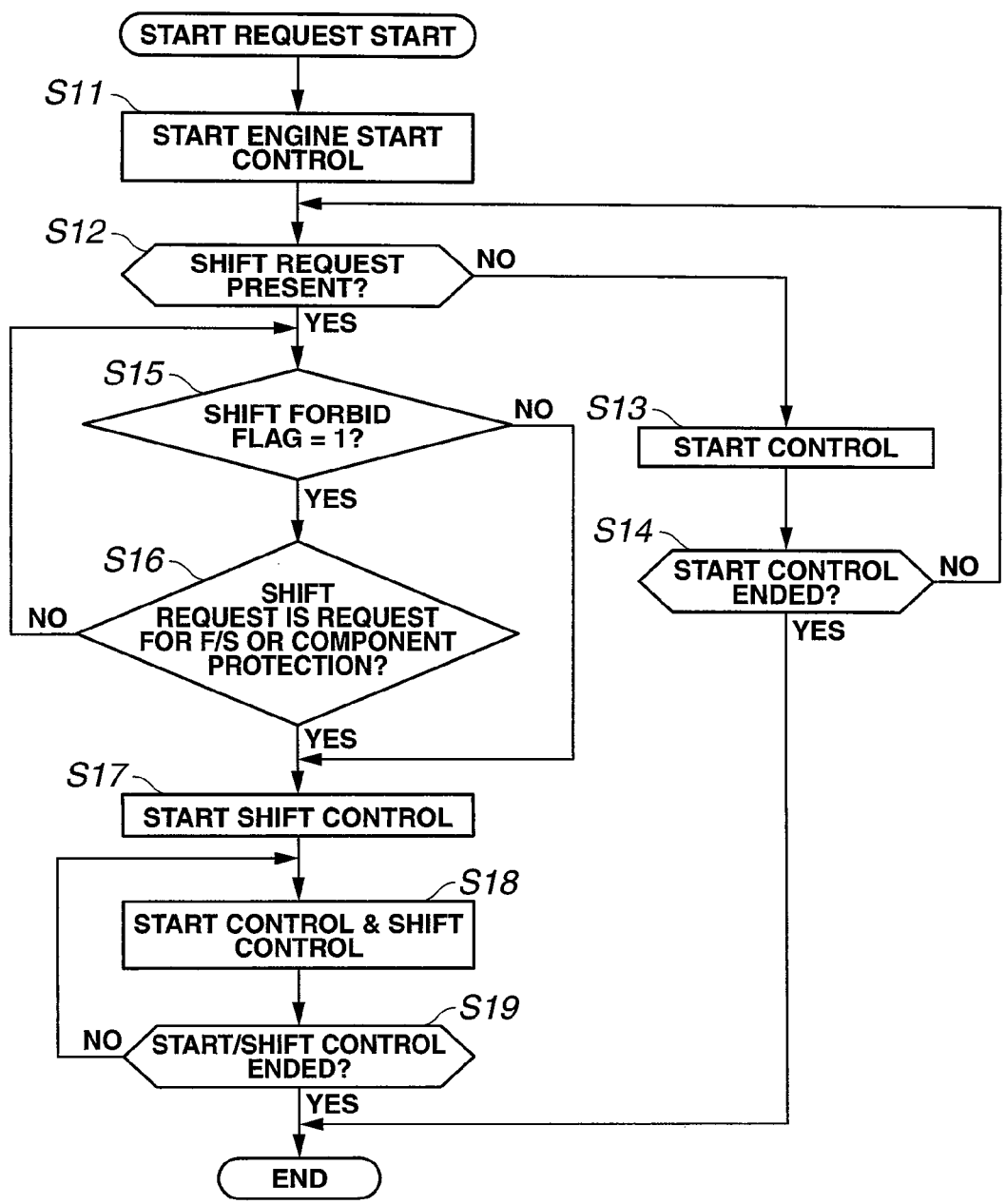
FIG. 7 is a flow chart showing engine/transmission coordinate control performed by the engine/transmission coordinate control system of FIG. 6 when a shift request is generated after a start of the start control.

FIG. 7 is a flowchart showing an engine/transmission coordinate control process (or engine/shift cooperation process) in the case of a shift request generated after a start of the start control.

At step S11, an engine/transmission coordinate control system of integrated controller 10 starts an engine start control in response to a start request of engine ENG.

At next step S12, the control system determines whether or not there is a shift request. From step S12, processing proceeds to step S15 in the case of YES (existence of the shift request), and to step S13 in the case of NO (nonexistence of the shift request).

Where the shift request is not generated as indicated by the response to step S12, engine start control is performed at step S13. At step S14, the control system determines whether the engine start control is finished or not. Where the engine start control is finished (YES), processing ends. Where the engine start control is not yet finished (NO), the control system returns to step S12 to continue to monitor for a shift request and a shift forbid flag.

In contrast, after the judgment at step S12 that the shift request is present, the control system determines whether the shift forbid flag is equal to one (forbid) or not in step S15. From step S15, the control system proceeds to step S16 in the case of YES (shift forbid flag=1) and to step S17 in the case of NO (shift forbid flag=0). The shift forbid flag is set to one (forbid) in the following cases. Otherwise, the shift forbid flag is zero (permit).

First, the shift forbid flag is set to one when the shift is to be performed during motor rotational speed control and the determination of the gear ratio is unfeasible on the shift control side. For example, the control system forbids an upshift during the engine start in the entire region. Furthermore, the control system forbids both an upshift and a downshift during the WSC mode in the entire region.

Second, the shift forbid flag is set to one when the shift is a shift with the accelerator opening being held substantially constant and the driver's demand for reducing shock is high. For example, the control system forbids a power-on downshift with the accelerator being held constant during the engine starting operation. However, the control system sets a forbid region in dependence on the accelerator opening condition.

Third, the shift forbid flag is set to one when the shift is a shift in which the control over the transmission input torque is difficult and the possibility of affecting the shock is high. For example, the control system forbids both an upshift and a downshift at the time of engine starting operation in coast state in the entire region. The control system forbids both an upshift and a downshift in the entire region at the time of a backup start (the start of engine without causing the second clutch CL2 to slip, which would otherwise be conducted to absorb associated shock).

When the shift forbid flag is equal to 1 as indicated in step S15, the control system determines whether the shift request is either of a fail safe request or a component protection request in step S16. When the shift request is neither a fail safe request nor a component protection request (NO in step S16), processing reverts to step S15 to continue to monitor the status of the shift forbid flag. Where the shift request is a fail safe request or a component protection request (YES in step S16), processing advances to step S17.

At step S17, the control system starts the shift control after the judgment at step S15 that the shift forbid flag is equal to zero or the judgment at step S16 that the shift request is a fail safe request or a component protection request. At next step S18, the control system performs simultaneous operation of the engine start control and shift control, and then processing advances to step S19.

At step S19, the control system determines whether both the engine start control and the shift control are finished. If the engine start control and the shift control are finished (YES in step S19 indicating end of the start/shift control), processing is complete. If not (NO), processing returns to step S18 to continue simultaneous operation of the engine start control and shift control.

Figure 8:
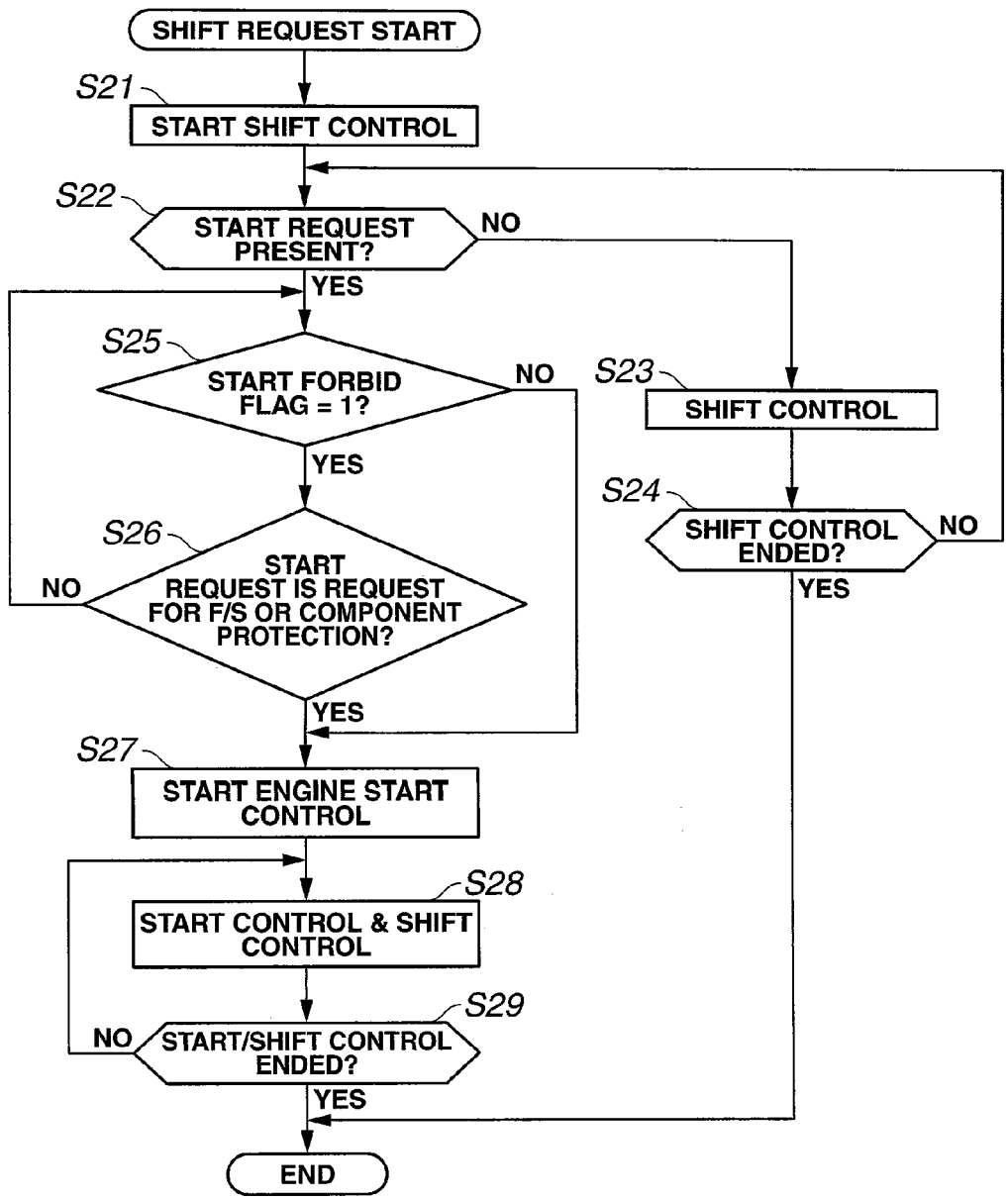
FIG. 8 is a flow chart showing the engine/transmission coordinate control performed by the engine/transmission coordinate control system of FIG. 6 when a start request is generated after a start of the shift control.

FIG. 8 is a flowchart showing the engine/transmission coordinate control process (or engine/shift cooperation process) in the case of a start request after a start of the shift control.

At step S21, the control system starts a shift control in response to a shift request.

Next, at step S22, the control system determines whether or not there is an engine start request. From step S22, the control system proceeds to step S25 in the case of YES (engine start request is present) and to step S23 in the case of NO (engine start request is absent).

Where the engine start request in absent as indicated by the response to step S23, shift control is performed at step S23. At step S24, the control system determines whether the shift control is finished or not. Where the shift control is finished (YES), processing ends. Where the shift control is not yet finished (NO), the control system returns to step S22 to continue to monitor for an engine start request and a start forbid flag.

In contrast, after the judgment at step S22 that the engine start request is present, the control system determines whether the start forbid flag is equal to one (forbid) or not in step S25. From step S25, the control system proceeds to step S26 in the case of YES (start forbid flag=1) and to step S27 in the case of NO (start forbid flag=0). The start forbid flag is set to one (forbid) in the following cases, and otherwise the start forbid flag is equal to zero (permit).

First, the start forbid flag is set to one when transmission AT is in a shift phase in which second clutch CL2 (slip clutch) cannot retain its slip due to capacity balance between second clutch CL2 (slip clutch) controlled in the slipping state in the engine start control and the shift clutch participating in the shift. For example, the control system forbids the engine start during the pretreatment in a 1→2 upshift.

Second, the start forbid flag is set to one when transmission AT is in a shift operation in which the engagement clutch in the shift is the same as second clutch CL2 controlled in the slipping state in the engine start control when the engine start control is performed. For example, the control system forbids the engine start during a 2→3 upshift and during a 3→4 upshift.

Third, the start forbid flag is set to one when transmission AT is in a shift operation using one-way clutch(s). For example, the control system forbids the engine start during a 3→2 downshift and during a 2→1 downshift.

Fourth, the start forbid flag is set to one when transmission AT is in a shift phase region in which motor rotational speed control is performed in the shift. For example, the control system forbids the engine start in the region in which the shift phase is in a CL synchronizing phase.

When the start forbid flag is equal to 1 as indicated in step S25, the control system determines whether the start request is either of a fail safe request or a component protection request in step S26. When the start request is neither a fail safe request nor a component protection request (NO in step S26), processing reverts to step S25 to continue to monitor the status of the start forbid flag. Where the start request is a fail safe request or a component protection request (YES in step S26), processing advances to step S27.

Note that the control system repeats the determination of step S25 during execution of the shift control and ensures the execution of the start control at the time point at which the start forbid flag is reset, even during the shift control.

At step S27, the control system starts the engine start control after the judgment at step S25 that the start forbid flag is equal to zero, or the judgment at step S26 that the start request is a fail safe request or a component protection request. At next step S28, the control system performs simultaneous operation of the engine start control and shift control, and then processing advances to step S19.

At step S29, the control system determines whether both the engine start control and the shift control are finished. If the start/shift control is finished (YES in step S29), processing is complete. If not (NO), processing returns to step S28 to continue simultaneous operation of the engine start control and shift control.

Operations of the control apparatus of the FR hybrid vehicle according to the first embodiment are divided for explanation into three parts: 1) engine/transmission coordinate control operation in the case of a shift request after a start of the start control, 2) engine/transmission coordinate control operation in the case of a start request after a start of the shift control, and 3) operation in examples in a 1→2 upshift.

1) Engine/Transmission Coordinate Control Operation in the Case of a Shift Request After a Start of the Start Control Referring to FIG. 7, when the shift request is generated during the engine start control, and the shift forbid flag is equal to 0 (permit), the control system takes a course of S11→S12→S15→S17. Thus, the control system starts the shift control at the request timing of the shift request. Then, from S17, the control system proceeds through a course of S18→S19, repeatedly performing the engine start control and the shaft control simultaneously. Then, the control system terminates the start/shift coordinate control when step S19 indicates that the start/shift control is finished. The control system repeats the determination of step S15 during execution of the start control, and ensures the execution of the shift control at the time point at which the shift forbid flag is reset, even during the start control.

When the shift request is generated during the engine start control, the shift forbid flag is equal to one (forbid), and the shift request is neither a failsafe request nor a component protection request, then the control system follows a control flow in the flowchart of FIG. 7 of S11→S12→S15→S16 and repeats the flow of S15→S16 as long as the shift forbid flag is equal to one. When the shift forbid flag is reset to zero, the control system proceeds from S15 to S17, and starts the shift control at the reset timing of the flag resetting. From step S17, the control system proceeds to a flow of S18→S19, repeatedly performing the simultaneous processing operation of the engine start control and shift control. Then, the control system terminates the start/shift coordinate control in response to an affirmative answer to step S19 that the start/shift control is finished.

Therefore, in the situation in which shock is not problematical (shift forbid flag=0) even if the engine start control and shift control are performed simultaneously, the control system starts the shift control responsively at the request timing of the shift request if the shift request is generated during the engine start control. Moreover, in the situation in which the shock is problematical (shift forbid flag=1) if the engine start control and shift control are performed simultaneously, the control system waits until the timing permitting the shift control (the flag resetting timing) when the shift request is generated during the engine start control, and then starts the shift control. That is, the control system repeats the determination of step S15 during the start control, and ensures the initiation of the shift control at the timing of the shift forbid flag being cleared, even during the engine start control.

As described, in the situation where shock is not problematical, the control system processes the engine start control and shift control simultaneously with a high responsiveness without a delay in starting the shift control. In the situation where shock is problematical, the control system processes the engine start control and shift control simultaneously after a minimum period for deferring a start of the shift control until shock is not problematical during the execution period of the start control. Therefore, when the shift request is generated during the engine start control, the control system can prevent a shock and moreover restrain adverse influence to the lag and fuel consumption to a minimum level. Thus, the control system can give priority to the prevention of shock during the execution period of the engine start control, while reducing the adverse influence on the lag and fuel consumption.

The engine start control is performed under command of integrated controller 10 in the following manner. When the accelerator opening degree APO surpasses an engine starting line during traveling operation in the EV mode, then an engine start request is generated. The engine start control is started in response to the engine start request. In the engine start control, first the control system controls the torque capacity of second clutch CL2 so as to cause second clutch CL2 to slip in a half clutch state. Then, after affirmation of the start of slip of second clutch CL2, the control system starts engagement of first clutch CL1 and increases the engine rotational speed by a cranking operation with motor/generator MG serving as a starter motor. Then, the control system starts the combustion operation of engine ENG when the engine rotational speed reaches an engine speed level allowing the first explosion and engages the first clutch CL1 completely when the motor speed and engine speed become close to each other. Thereafter, the control system changes the drive mode to the HEV mode by locking up the second clutch CL2.

The shift control is performed under command of AT controller 7, independent from the engine start control, in the following manner. When, during traveling state, the operating point (VSP, APO) traverses the upshift or downshift line in the shift map shown in FIG. 2, a shift request is generated. The shift control is started in response to this shift request. In the shift control, a basic operation is performed by a replacement fluid pressure control that disengages one friction element from the engaged state to the disengaged state and engages another friction element from the disengaged state to the engaged state. The shift operation is completed by pretreatment control→torque phase control→inertia phase control→CL synchronizing phase control→after treatment control. In this case, the control system controls these sections or periods of shift from the shift start to the shift end individually. The control system performs this individual control by using various information such as timer information and information on variation of the gear ratio calculated from the input and output speeds of transmission AT, and thereby monitoring the degree of progress of the shift operation.

The shift forbid flag is set in the following manner in the first embodiment.

The shift forbid flag is set to one (forbid) during motor speed control of the engine start control such that it is not possible to determine the gear ratio on the shift control side. Specifically, the slip control of second clutch CL2 is performed by the motor speed control during the engine start control and during the WSC mode. If, in this case, the shift control is initiated, the shift control side is unable to monitor the progress of the shift operation and is unable to grasp the disengaged/engaged state of the clutch. Accordingly, the shift might produce a great shock. Therefore, an upshift is forbidden in the entire slip control region. In the WSC mode, upshift and downshift are both forbidden in the entire slip control region. In this manner, the control system can prevent shift shock due to the initiation of the shift control during the engine start control in the traveling operation in which the control system is unable to ascertain the disengagement/engagement state of the clutch. Downshift during the engine starting operation is mainly originated from a driver's accelerator depressing operation. Therefore, in the case of downshift during the engine starting operation, the shift forbid flag is cleared to zero (permit) in order to put importance on a driver's ability to control the driving force and eliminate lag.

In the first embodiment, the shift forbid flag is also set to one (forbid) during the engine start control when the accelerator is held constant and the driver's demand for reducing shock is high. During traveling operation with APO being constant, shock sensitivity is higher as compared to lag sensitivity. Therefore, in the case of power-on downshift with the accelerator being held constant during the engine start operation, the control system forbids the shift by giving priority to the shock sensitivity over the lag sensitivity. Thus, the control system can prevent shift shock due to initiation of the shift control during the engine start control in the driving situation where the driver's demand for reducing shock is high.

In the first embodiment, the shift forbid flag is also set to one (forbid) during the engine start control when control of the transmission input torque is difficult and the possibility of influence on the shock is high. Specifically in coast traveling with the accelerator being released, and in a backup start making no use of the slip of second clutch CL2, the control of the transmission input torque is difficult and the possibility of shock becomes high if the shift control is involved during the engine starting operation. Therefore, the control system forbids both an upshift and a downshift in the entire coast traveling region and forbids both an upshift and a downshift in the entire backup start region. In this way, the control system can prevent shift shock caused by the involvement of the shift control during the engine start control in traveling situations where the control of the transmission input torque is difficult.

2) Engine/Transmission Coordinate Control Operation in the Case of a Start Request After a Start of the Shift Control Referring to FIG. 8, when the engine start request is generated during the shift control from a start to an end of the shift control, and the start forbid flag is equal to 0 (permit), the control system takes a course of S21→S22→S25→S27. Thus, the control system starts the engine start control at the request timing of the engine start request. Then, from S27, the control system proceeds through a course of S28→S29, repeatedly performing the engine start control and the shaft control simultaneously. Then, the control system terminates the start/shift coordinate control when step S29 indicates that the start/shift control is finished.

When the engine start request is generated during the shift control, the start forbid flag is equal to one (forbid), and the start request is neither a failsafe request nor a component protection request, then the control system follows a control flow in the flowchart of FIG. 8 of S21→S22→S25→S26 and repeats the flow of S25→S26 as long as the start forbid flag is equal to one. When the start forbid flag is reset to zero, the control system proceeds from S25 to S27, and starts the engine start control at the reset timing of the flag resetting.

From step S27, the control system proceeds to a flow of S28→S29, repeatedly performing the simultaneous processing operation of the engine start control and shift control. Then, the control system terminates the start/shift coordinate control in response to an affirmative answer to step S29 that the start/shift control is finished.

Therefore, in the situation in which shock is not problematical (start forbid flag=0) even if the engine start control and shift control are performed simultaneously, the control system starts the engine start control responsively at the request timing of the engine start request if the start request is generated during the shift control. Moreover, in the situation in which the shock is problematical (start forbid flag=1) if the engine start control and shift control are performed simultaneously, the control system waits until the timing permitting the engine start control (the flag resetting timing) when the engine start request is generated during the shift control, and then starts the engine start control.

As described, in the situation where shock is not problematical, the control system processes the engine start control and shift control simultaneously with a high responsiveness without a delay in starting the engine start control. In the situation where shock is problematical, the control system processes the engine start control and shift control simultaneously after a minimum period for deferring a start of the engine start control until shock is not problematical. Therefore, when the start request is generated during the shift control, the control system can prevent a shock and moreover restrain adverse influence to the lag and fuel consumption to a minimum level. Thus, the control system can give priority to the prevention of shock during the execution period of the shift control, while reducing the adverse influence on the lag and fuel consumption.

The start forbid flag is set in the following manner in the first embodiment.

The start forbid flag is set to one (forbid) during the shift control where second clutch CL2 cannot retain its slipping condition because of capacity balance of second clutch CL2 and the clutch involved in the shift. That is, involvement of the engine start control in the shift control in the situation where second clutch CL2 is unable to retain the slipping state might cause a great starting shock. For example, the engine starting operation is forbidden during pretreatment in a 1→2 upshift. Thus, the control system can prevent starting shock from being caused by involvement of the engine start control in the shift control where second clutch CL2 is unable to retain its slipping state.

In the first embodiment, the start forbid flag is also set to one (forbid) during a shift operation in which second clutch CL2 and the clutch to be engaged in the shift are one and the same. Specifically, if the engagement clutch in the shift is the same as second clutch CL2 slipped in the engine start control, it is not possible to use forcible slip-in, and there is a possibility of great starting shock. In this example, the control system forbids the engine start control during a 2→3 upshift and a 3→4 upshift, which are shifts meeting this condition. Thus, the control system can prevent starting shock in the situation where the engagement clutch is the same as the second clutch CL2 slipped in the engine start control.

In the first embodiment, the start forbid flag is also set to one (forbid) during a shift using a one-way clutch. There is a possibility of collision shock of a one-way clutch if the engine start control occurs during a shift using that one-way clutch. In this case, the engine start control is forbidden during a 3→2 downshift and a 2→1 downshift, which meet this condition. Therefore, the control system can prevent collision shock due to initiation of the engine start control during the shift control using one or more one-way clutches.

Figure 16:
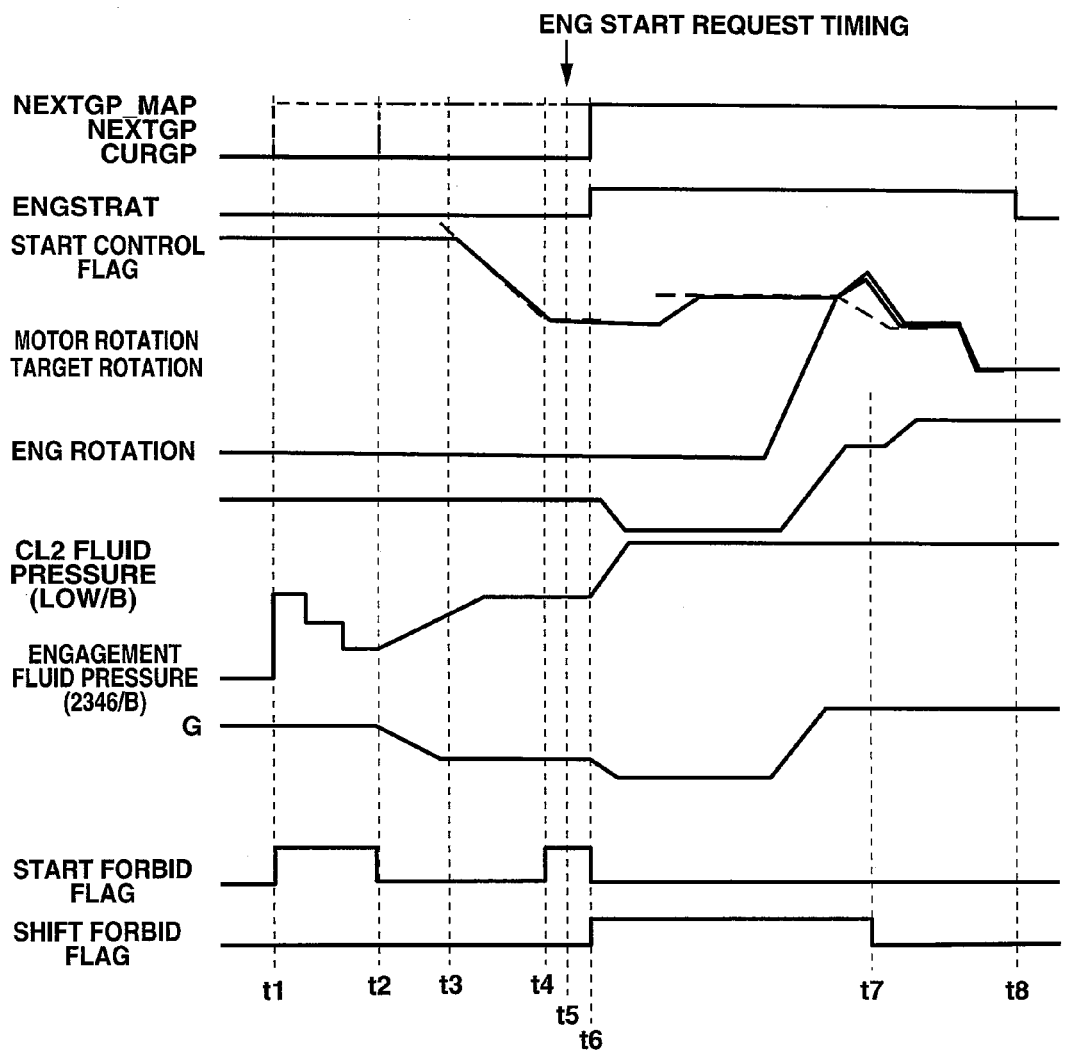
FIG. 16 is a time chart showing characteristics of certain variables at a during shift CL synchronizing phase start forbidding timing.

In the first embodiment, the start forbid flag is also set to one (forbid) in a shift phase region where motor rotational speed control is performed while second clutch CL2 is engaged. (See FIG. 16). Specifically, the system might judge a slipping state of second clutch CL2 erroneously and allow engagement of first clutch CL1 if the engine start control is started in a shift using motor rotation speed control, resulting in a feeling of dash out. This is because the engine start control monitors input speed (as sensed by resolver 13 (of motor generator MG) and output speed (as sensed by vehicle speed sensor 17) to control slip of second clutch CL2 and subsequent engagement of first clutch CL1 upon an engine start request. The control system might judge, based on the speed change ratio (vehicle speed/MG revolutions), that second clutch CL2 would be sufficiently slipped so that first clutch CL1 could be engaged to receive engine torque. As FIG. 16 illustrates, it is another clutch (2346/B) that is under synchronization control for shift control, not second clutch CL2. Therefore, a false judgment would occur. Therefore, the engine start control is forbidden in a CL synchronizing phase meeting this condition. In this way, the control system can prevent a feeling of dash out caused by initiation of the engine start control in the shift control where motor rotational speed control is performed.

3) Operation in Examples in a 1→2 Upshift

Figures 9, 10:
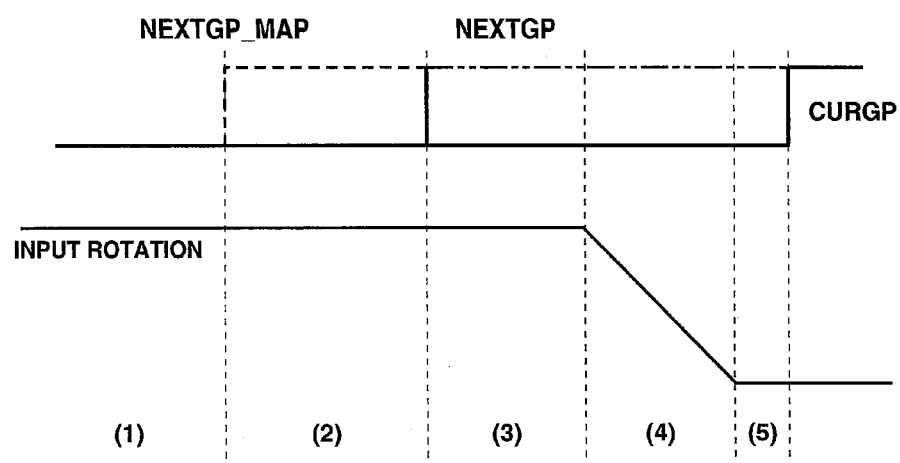
FIG. 9 is a selection table illustrating a method for selecting a second clutch from the friction elements of an automatic transmission.
FIG. 10 is a view illustrating examples for forbidding the shift, forbidding the start and permitting the start at various timings as related to certain variables in a 12 upshift.

FIG. 10 illustrates preset examples of setting the shift forbiddance, start forbiddance and start permission at timings (1) through (5) in relation to a shift command gear ratio NEXTGP_MAP (shown by broken line), a control gear ratio NEXTGP (two-dot chain line), a current gear ratio CURGP (solid line) and input rotation speed in the case of a 1→2 upshift. The ratio NEXTGP_MAP is a shift command gear ratio output when the operating point traverses a shift line in the shift map shown in FIG. 2. The ratio NEXTGP is a control gear ratio output when each shift control is determined and the shift control is started. The ratio CURGP is a current gear ratio output at an end of each shift control.

With respect to the timings, timing (1) is a during start upshift entire forbidding timing that forbids an upshift during the entirety of the engine start control. Timing (2) is a during shift pretreatment start forbidding timing that forbids an engine start during pretreatment of a shift. Timing (3) is a during shift torque phase start permitting timing that permits the engine start control during a torque phase of a shift. Timing (4) is a during shift inertia phase start permitting timing that permits an engine start during an inertia phase of a shift. Timing (5) is a during shift CL synchronizing phase start forbidding timing that forbids an engine start during a CL synchronizing phase of a shift. The following is explanation on operations at each of the timings (1) though (5).

Figure 11:
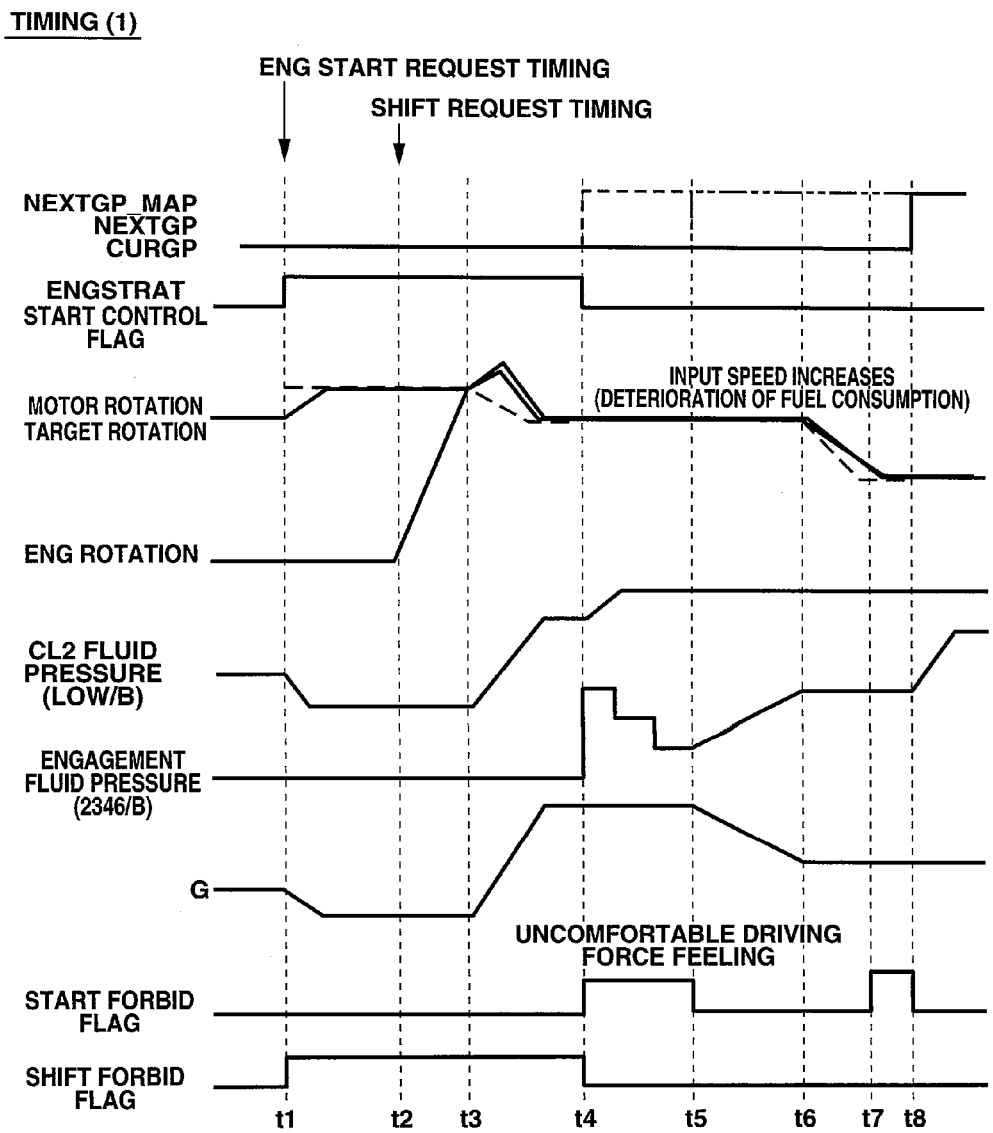
FIG. 11 is a time chart showing characteristics of certain variables at a during start upshift entire forbidding timing.

FIG. 11 is a time chart at the during start upshift entire forbidding timing (1). The variables shown are NEXTGP_MAP, NEXTGP, CURGP, start control flag (ENGSTART), motor rotation, target rotation, ENG rotation, CL2 fluid pressure, engagement fluid pressure, longitudinal acceleration G, start forbid flag, and shift forbid flag. In the case of the during start upshift entire forbidding timing, the engine start control is started at time t1 when an engine start request is generated, and the engine start control is ended at time t4. On the shift control side, even if a shift request is generated at time t2 shortly after time t1, the shift forbid flag is set during the engine start control from t1 to t4. Hence the shift control is started at time t4, at which time the engine start control ends. This exclusive treatment forbidding an upshift acts to increase the input rotational speed and deteriorate fuel consumption. Moreover, after acceleration G is increased by transmission of the driving force at first speed, acceleration G is decreased by the consecutive upshift to second speed. In this way, acceleration G is varied so as to provide the driver uncomfortable feeling of the driving force.

Figure 12:
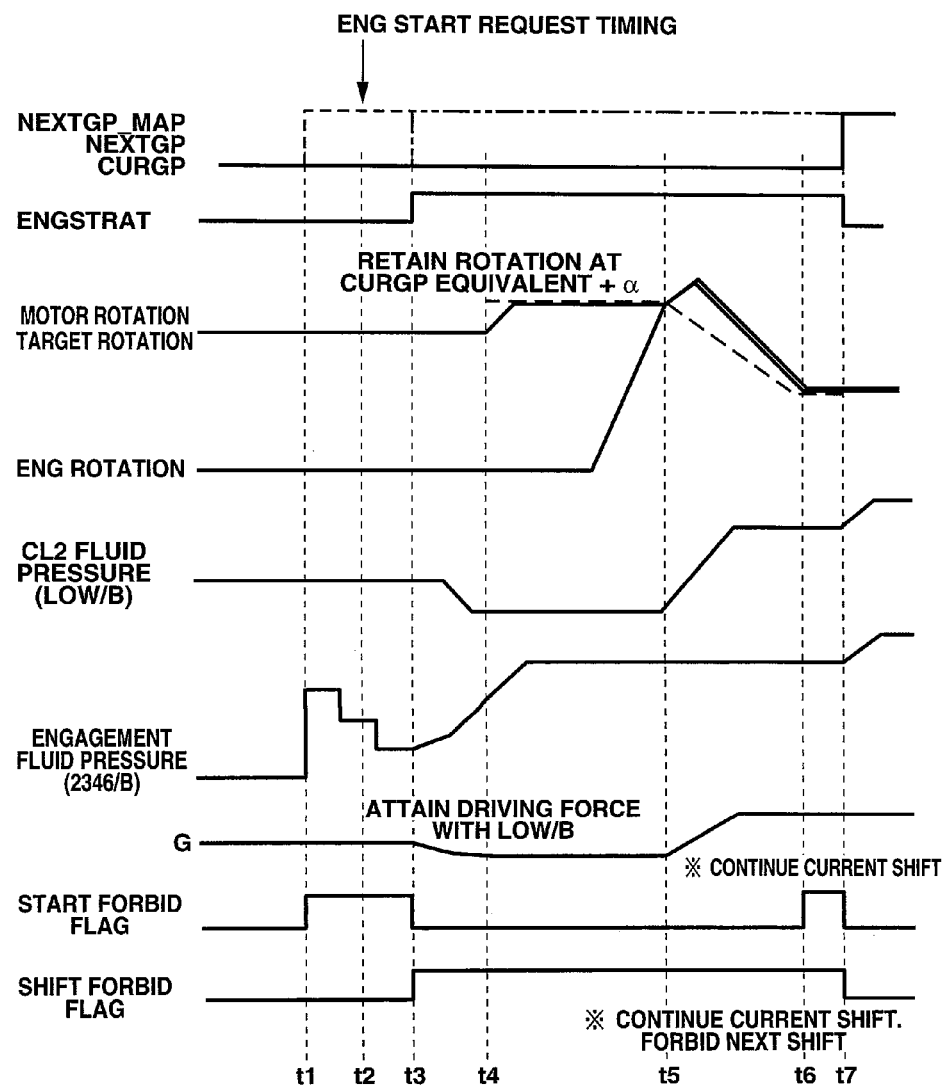
FIG. 12 is a time chart showing characteristics of certain variables at a during shift pretreatment start forbidding timing.

FIG. 12 is a time chart at the during shift pretreatment start forbidding timing (2). Again, the variables shown are NEXTGP_MAP, NEXTGP, CURGP, start control flag (ENGSTART), motor rotation, target rotation, ENG rotation, CL2 fluid pressure, engagement fluid pressure, longitudinal acceleration G, start forbid flag, and shift forbid flag. In the case of the during shift pretreatment start forbidding timing, the shift control is started at time t1, and a period from time t1 to time t3 is the period of pretreatment. During this period from t1 to t3, the start forbid flag is set. Therefore, the start of the engine start control is deferred from time t2, at which an engine start request is produced, to the later time t3. When the engine start request is producing during the shift control, the control system is unable to maintain the slipping state of second clutch CL2 during pretreatment. Therefore, the start forbid flag is set for the period of pretreatment. In and after the torque phase, the control system performs the shift control and the engine start control simultaneously.

Figure 13:
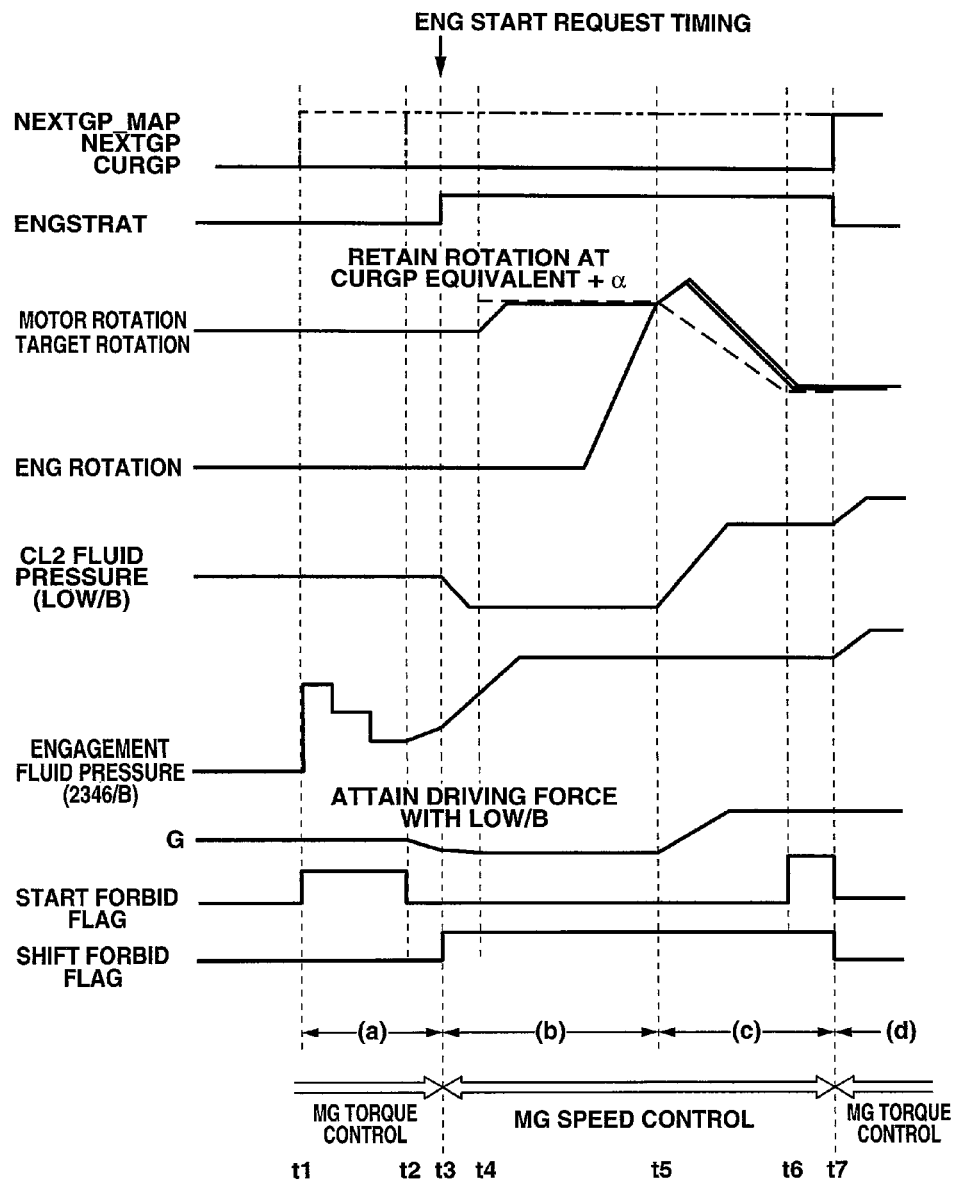
FIG. 13 is a time chart showing characteristics of certain variables at a during torque phase start permitting timing.

FIG. 13 is a time chart at the during shift torque phase start permitting timing (3). The variables shown are NEXTGP_MAP, NEXTGP, CURGP, start control flag (ENGSTART), motor rotation, target rotation, ENG rotation, CL2 fluid pressure, engagement fluid pressure, longitudinal acceleration G, start forbid flag, and shift forbid flag. In the case of the during shift torque phase start permitting timing (3), the start forbid flag is set to one during the period of pretreatment of a shift from time t1 to time t2. The engine start control is started immediate at time t3 in response to the engine start request generated at time t3 during the torque phase. Thus, when the engine start request is generated during the torque phase, the control system starts the engine start control at the request timing of the engine start request, and thereafter performs the shift control and engine start control simultaneously.

The control system forbids the engine start during pretreatment and permits the engine start during the torque phase for the following reason.

Figure 14:
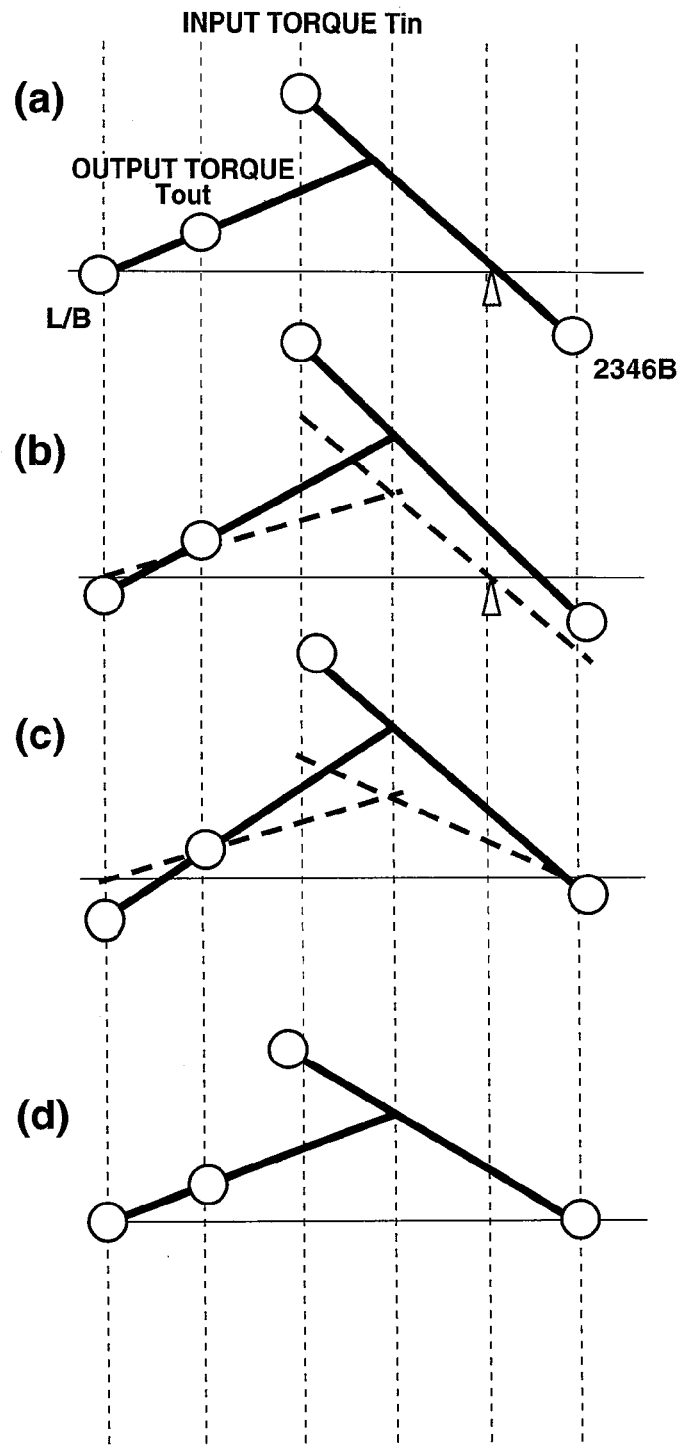
FIG. 14 is a nomogram showing rotation speed variation in the automatic transmission AT at the during torque phase start permitting timing of FIG. 13.

FIG. 14 is a nomogram or collinear diagram representing rotational speed variation in automatic transmission AT at the during shift torque phase start permitting timing (3). At the time of a 1→2 upshift, it is necessary to use Low/B as second clutch CL2 and to hold the slip of second clutch CL2 by motor rotational speed control during the engine start control. Referring to the times in FIG. 13, the 1→2 upshift is performed by the passage of first speed in-gear state of (a), corresponding to times t1 through t3→torque/inertia phase state of (b), corresponding to times t3 though t5→synchronizing phase state of (c), corresponding to times t5 though t7→second speed in-gear state of (d), corresponding to time t7 and later. In this case, the capacity of 2346/B serving as the engagement element in the 1→2 upshift becomes deficient in the torque phase and inertia phase. Therefore, the input rotation speed decreases as showing by broken lines in (b) and (c), and the system becomes unable to retain the slip of Low/B used as second clutch CL2. Thus, there arises a possibility of shock and acceleration G decrease if the input rotational speed is decreased under the speed of the first speed before 2346/B obtains capacity. It has been found that factors for decreasing the input rotational speed are excessive gripping of first clutch CL1 or deficiency of the transmission input torque due to deficient MG torque. Therefore, by permitting the start of the engine start control positively during the torque phase, the control system can remedy the deficiency of the transmission input torque and hold the slipping state of second clutch CL2 (Low/B) as shown by a solid line in FIG. 14.

Figure 15:
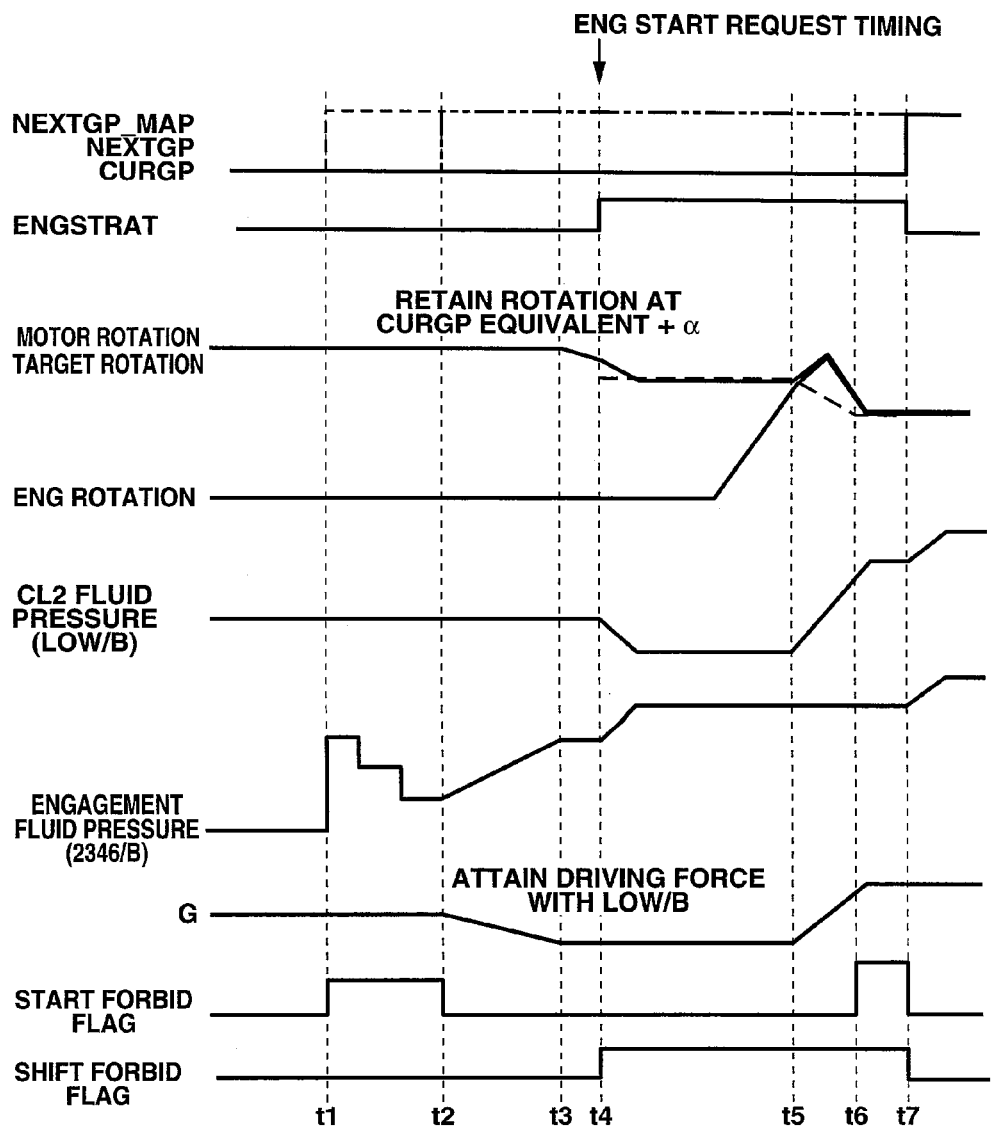
FIG. 15 is a time chart showing characteristics of certain variables at a during shift inertia phase start permitting timing.

FIG. 15 is a time chart at the during shift inertia phase start permitting timing (4). Again, the variables shown are NEXTGP_MAP, NEXTGP, CURGP, start control flag (ENGSTART), motor rotation, target rotation, ENG rotation, CL2 fluid pressure, engagement fluid pressure, longitudinal acceleration G, start forbid flag, and shift forbid flag. In the case of the during shift inertia phase start permitting timing, if the engine start request is generated at time t4 in an inertia phase start region of a shift, the engine start control is started immediately at time t4 and is ended at time t7. On the shift control side, on the other hand, the motor speed control is performed in response to a request from the engine start control, and the shift forbid flag is set from time t4 to time t7.

FIG. 16 is a time chart at the during CL synchronizing phase start forbidding timing (5). The variables shown are NEXTGP_MAP, NEXTGP, CURGP, start control flag (ENGSTART), motor rotation, target rotation, ENG rotation, CL2 fluid pressure, engagement fluid pressure, longitudinal acceleration G, start forbid flag, and shift forbid flag. In the case of the during CL synchronizing phase start forbidding timing, if an engine start request is generated at time t5 in a CL synchronizing phase of a shift (between time t4 and time t6), the engine start control is deferred until time t6. The engine start control is started at time t6 and ended at time t8. On the shift control side, motor speed control is performed from time t6 to time t7 in response to a request from the engine start control, and the shift forbid flag is set. However, the current shift operation is continued and ends just after time t6.

The control system for the hybrid vehicle according to the first embodiment can provide following effects.

A first embodiment includes a control apparatus for controlling a hybrid vehicle comprising an engine ENG, a motor (motor/generator MG) provided in a drive system from the engine ENG to a driving wheel RL, RR, and arranged to start the engine ENG and drive the driving wheel RL, RR, mode selecting means (first clutch CL1) provided between the engine ENG and the motor (motor/generator MG), and arranged to change over a vehicle drive mode between a hybrid drive mode (HEV mode) using the engine ENG and the motor (motor/generator MG) as a drive source and an electric drive mode (EV mode) using the motor (motor/generator MG) as the drive source, an automatic transmission AT disposed between the motor (motor/generator MG) and the driving wheel RL, RR, and arranged to have a plurality of gear positions of different speed ratios, engine start/stop controlling means (integrated controller 10) for performing a start control of the engine ENG in response to a start request at the time of mode changeover to the hybrid drive mode (HEV mode), and a stop control of the engine ENG in response to a stop request at the time of the mode changeover to the electric drive mode (EV mode), shift controlling means (AT controller 7) for performing a shift control of changing the gear position of the automatic transmission from a current position to a request position in response to a shift request during travel of the vehicle and engine/transmission coordinate controlling means (FIGS. 6 through 8) which, when during a first control which is one of the engine start/stop control of the engine ENG and the shift control of the automatic transmission AT, starts a second control which is the other of the engine start/stop control of the engine ENG and the shift control of the automatic transmission AT, at a request timing of the second control request when a shock does not exceeds an acceptable level even if the second control is started at the request timing, and starts the second control by waiting until a permitting timing to permit the second control when the shock exceeds the acceptable level if the second control is started at the request timing.

The control apparatus can prevent shock and minimize adverse influence on lag and fuel consumption when, during one of the start/stop control of engine ENG and the shift control of automatic transmission AT, a control request for the other is generated.

There is provided a shift forbid flag setting means (shift forbiddance determining section 10d) for setting a shift forbid flag when a condition affecting a shock is satisfied if the shift control is initiated after a start of the engine start control. If the shift forbid flag is not set, the engine/transmission coordinate control means (FIG. 7) starts the shift control at a request timing when a shift control request is generated during the engine start control. If the shift forbid flag is set, the engine/transmission coordinate control means (FIG. 7) defers the shift control until a timing at which the shift forbid flag is reset and starts the shift control at the reset timing.

Therefore, when a shift control request is generated during the engine start control, the control apparatus can prevent shock and minimize adverse influence on lag and fuel consumption. Thus, the control apparatus gives priority to prevention of the shift shock, and the control apparatus can restrain the adverse influence on the lag and fuel consumption by monitoring the shift forbid flag regularly so as to meet the shift control request during the performance period of the engine start control before an end of the engine start control.

The shift forbid flag setting means (shift forbiddance determining section 10d) sets the shift forbid flag when the shift is requested during a motor rotational speed control and determination of the gear ratio on the shift control side is not feasible. Therefore, the control apparatus can prevent shift shock due to initiation of the shift control during the engine start control in a traveling situation where the disengaged/engaged state of the clutch is uncertain.

The shift forbid flag setting means (shift forbiddance determining section 10d) sets the shift forbid flag when the shift is requested with a constant accelerator opening and a driver's demand for reducing shock is high. Therefore, the control apparatus can prevent shift shock due to initiation of the shift control during the engine start control in a driving situation where the driver's demand for reducing shock is high.

The shift forbid flag setting means (shift forbiddance determining section 10d) sets the shift forbid flag when the shift is requested where the control of the transmission input torque is difficult and the possibility of affecting shock is high. Therefore, the control apparatus can prevent shift shock due to initiation of the shift control during the engine start control in a driving situation where the control of the transmission input torque is difficult.

Though it is preferable to incorporate all these settings of the shift forbid flag into the control system, it is possible to incorporate one or more of the settings.

There is provided a start forbid flag setting means (start forbid flag generating section 71a) for setting a start forbid flag when a condition affecting a shock is satisfied if the engine start control is initiated after a start of the shift control. The engine/transmission coordinate control means (FIG. 8) starts the engine start control at a request timing when an engine start control request is generated during the shift control in the case in which the start forbid flag is not set and starts the engine start control at a timing at which the start forbid flag is reset by deferring the engine start control in the case in which the start forbid flag is set.

Therefore, when an engine start control request is generated during the shift control, the control apparatus can prevent shock and minimize adverse influence on lag and fuel consumption. Thus, the control apparatus gives priority to prevention of shift shock, and the control apparatus can restrain the adverse influence on the lag and fuel consumption by monitoring the start forbid flag regularly during the performance period of the shift control before an end of the shift control and by starting the engine start control immediately when the flag is reset.

The start forbid flag setting means (start forbid flag generating section 71a) sets the start forbid flag in the case of a shift phase in which a slip clutch controlled to slip in the start control is unable to retain the slip because of a capacity balance between the slip clutch and a shift clutch participating in the shift. Therefore, in addition to the effect of minimizing adverse influence on lag and fuel consumption, the control apparatus can prevent start shock due to initiation of the engine start control during the shift control in a situation where second clutch CL2 is unable to retain slip in the engine start control.

The start forbid flag setting means (start forbid flag generating section 71a) sets the start forbid flag during a shift in which a slip clutch controlled to slip in the start control and an engagement clutch in the shift are the same to each other. Therefore, in addition to the effect of minimizing adverse influence on lag and fuel consumption, the control apparatus can prevent start shock due to initiation of the engine start control during the shift control in a situation where second clutch CL2 is the same as the engagement clutch in the shift. The start forbid flag setting means (start forbid flag generating section 71a) sets the start forbid flag during a shift using a one-way clutch. Therefore, in addition to the effect of minimizing adverse influence on lag and fuel consumption, the control apparatus can prevent collision shock due to initiation of the engine start control during the shift control in a situation where the shift using the one-way clutch is in progress.

Though it is preferable to incorporate all these settings of the start forbid flag into the control system, it is possible to incorporate one or more of the settings.

The start forbid flag setting means (start forbid flag generating section 71a) sets the start forbid flag in a shift phase region in which the motor rotational speed control is performed in the shift. This option allows the control apparatus to additionally prevent dash-out feeling due to initiation of the engine start control during the shift control in the shift phase region in which the motor speed control is performed.

Although the hybrid vehicle controlling apparatus according to the present invention has been described above with reference to a first embodiment of the invention, the invention is not limited to the first embodiment. Various modifications, variations of the design and addition are allowable within the purview of the present invention as defined by the claims.

In the illustrated example according to the first embodiment, during a control of one of the engine start control and the shift control, a control request for the other is generated. However, the coordinate control according to the present invention is applicable to the case in which, during a control of one of the engine stop control and the shift control, a control request for the other is generated.

In the illustrated example of the first embodiment, second clutch CL2 is selected among the friction elements incorporated in step automatic transmission AT. However, it is optional to provide a separate second clutch CL2 in addition to automatic transmission AT. For example, the scope of the invention includes an example in which second clutch CL2 separate from automatic transmission AT is provided between motor/generator MG and the transmission input shaft, and an example in which second clutch CL2 separate from automatic transmission AT is provided between the transmission output shaft and the driving wheel.

In the illustrated example, automatic transmission AT is the step automatic transmission having seven forward speeds and one reverse speed. However, the number of the gear positions is not limited to this. The automatic transmission may be an automatic transmission having two or more speeds.

In the first embodiment, the first clutch CL1 is used as the mode selecting means for switching between the HEV mode and the EV mode. However, the mode selecting means may be a differential device, a power splitting device or other device, such as a planetary gear, for functioning as a clutch without using a clutch.

In the illustrated example, the hybrid vehicle is a rear wheel drive hybrid vehicle. However, the present invention is applicable to a front wheel drive hybrid drive vehicle. The present invention is applicable to various other hybrid vehicles having an automatic transmission where the drive mode includes a HEV mode and an EV mode.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A control apparatus for controlling a hybrid vehicle, comprising:
    an engine;
    a motor provided in a drive system extending from the engine to a driving wheel, the motor arranged to start the engine and drive the driving wheel;
    a mode selecting device provided between the engine and the motor, the mode selecting device arranged to change over a vehicle drive mode between a hybrid drive mode using the engine and the motor as a drive source and an electric drive mode using the motor as the drive source;
    an automatic transmission disposed between the motor and the driving wheel, the automatic transmission arranged to provide a plurality of speed ratios;
    an integrated controller that performs an engine start/stop control, the engine start/stop control being a start control of the engine in response to a start request at the time of mode changeover to the hybrid drive mode or a stop control of the engine in response to a stop request at the time of the mode changeover to the electric drive mode; and
    an automatic transmission controller that performs a shift control of changing a gear position of the automatic transmission from a current position to a request position in response to a shift request during travel of the vehicle; and
    wherein a first control is one of the engine start/stop control and the shift control and a second control is another of the engine start/stop control and the shift control, the integrated controller is configured to:
        determine whether a condition exists such that a shock will exceed an acceptable level if a second control is started at a second control request when the second control request is generated during a performance period of a first control;
        forbid start of the second control at the second control request when the condition exists;
        repeatedly determine whether the condition continues to exist after forbidding start of the second control and during the performance period of the first control; and
        start the second control at a permitting timing after the second control request and during the performance period of the first control when the condition no longer exists.

2. The control apparatus of claim 1, wherein the second control request is the shift request for the shift control that occurs after a start of the first control which is the start control of the engine; and
    the integrated controller is further configured to start the shift control at the second control request if the second control request is generated during the start control when the condition does not exist and the shift forbid flag is not set, and to start the shift control at a reset timing at which the shift forbid flag is reset by deferring the shift control from the second control request when the condition does exist and the shift forbid flag is set.

3. The control apparatus of claim 2, wherein the integrated controller is configured to set the shift forbid flag when the condition exists that the shift request is a request for a shift during motor rotational speed control and a gear ratio on a shift control side cannot be determined.

4. The control apparatus of claim 2, wherein the integrated controller is configured to set the shift forbid flag when the condition exists that the shift request is a request for a shift with a constant accelerator opening.

5. The control apparatus of claim 2, wherein the integrated controller is configured to set the shift forbid flag when the condition exists that the shift request is a request for a shift during coast travel with the accelerator released or a backup start without use of slip.

6. The control apparatus of claim 1, wherein the integrated controller sets a start forbid flag when the second control request is the start control of the engine that occurs after a start of the shift control, the integrated controller further configured to:
    start the start control at the second control request if the second control request is generated during the shift control when the start forbid flag is not set; and
    start the start control at a reset timing at which the start forbid flag is reset by deferring the start control from the second control request when the start forbid flag is set.

7. The control apparatus of claim 6, wherein the integrated controller is configured to set the start forbid flag when the condition exists that a shift phase of the shift control occurs in which a clutch controlled to slip in the start control is unable to retain slip because of a capacity balance between the clutch and a shift clutch participating in the shift control.

8. The control apparatus of claim 6, wherein the integrated controller is configured to set the start forbid flag when the condition exists such that during a shift in which a clutch controlled to slip in the start control and an engagement clutch in the shift are identical to each other.

9. The control apparatus of claim 6, wherein the integrated controller is configured to set the start forbid flag when the condition exists that a shift is using a one-way clutch.

10. The control apparatus of claim 6, wherein the integrated controller is configured to set the start forbid flag when the condition exists that a shift phase of the shift control in which motor rotational speed control is performed in a shift.

11. A method for controlling a hybrid vehicle, the hybrid vehicle including an engine, a motor, a driving wheel and an automatic transmission disposed between the motor and the driving wheel and arranged to provide a plurality of speed ratios, the method comprising:

controlling a selection between an electric drive mode in which the hybrid vehicle is powered only by the motor and a hybrid drive mode in which the hybrid vehicle is powered by both the engine and the motor;
initiating an engine start/stop control to selectively perform the hybrid drive mode or the electric drive mode responsive to an engine start/stop request, the engine start/stop request being one of an engine start request or an engine stop request;
performing a shift control of the automatic transmission while the hybrid vehicle is travelling responsive to a speed ratio change request;
initiating a first control including one of the engine start/stop control and the shift control responsive to the engine start/stop request or the speed ratio change request, whichever is produced first;
receiving a request for a second control of the other of the engine start/stop control and the shift control while the first control is underway;
determining whether a condition exists such that a shift shock of the automatic transmission would be greater than an acceptable level if the request for the second control is performed upon receipt of the request for the second control;
forbidding start of the second control upon receiving the request for the second control when the condition exists during the first control;
repeatedly determining whether the condition continues to exist after forbidding start of the second control and during the first control; and
initiating the second control upon determination that the condition no longer exists during the first control.

* * * * *